United States Patent
Le Quere

(10) Patent No.: US 7,580,966 B2
(45) Date of Patent: Aug. 25, 2009

(54) METHOD AND DEVICE FOR REDUCING THE TIME REQUIRED TO PERFORM A PRODUCT, MULTIPLICATION AND MODULAR EXPONENTIATION CALCULATION USING THE MONTGOMERY METHOD

(75) Inventor: Patrick Le Quere, Villebon sur Yvette (FR)

(73) Assignee: Bull SA, Les Clayes Sous Bois (FR)

( * ) Notice: Subject to any disclaimer, the term of this patent is extended or adjusted under 35 U.S.C. 154(b) by 525 days.

(21) Appl. No.: 10/469,246

(22) PCT Filed: Mar. 13, 2002

(86) PCT No.: PCT/FR02/00897

§ 371 (c)(1),
(2), (4) Date: Aug. 28, 2003

(87) PCT Pub. No.: WO02/073450

PCT Pub. Date: Sep. 19, 2002

(65) Prior Publication Data

US 2004/0054705 A1    Mar. 18, 2004

(30) Foreign Application Priority Data

Mar. 14, 2001  (FR) .................................. 01 03480

(51) Int. Cl.
 *G06F 7/38* (2006.01)
(52) U.S. Cl. ..................................................... 708/491
(58) Field of Classification Search ................ 708/491, 708/492; 380/28
See application file for complete search history.

(56) References Cited

U.S. PATENT DOCUMENTS 6,185,596 B1    2/2001  Gressel et al.
7,046,800 B1*   5/2006  Tenca et al. .................... 380/28
7,174,015 B1*   2/2007  Koc et al. ....................... 380/28

OTHER PUBLICATIONS

Koc, CK et al: Multi-Operand Modulo Addition Using Cary Save Adders, Electronics Letters, IEE Stevenage, GB, vol. 26, No. 6, Mar. 15, 1990, pp. 361-363, XP000122754; ISSN: 0013-5194, p. 361, Right Hand col. Line 48,-p. 362, Right Hand col. Line 50.

(Continued)

*Primary Examiner*—Choung D Ngo
(74) *Attorney, Agent, or Firm*—Miles & Stockbridge P.C.; Eric G. King

(57) ABSTRACT

The invention relates to a method for speeding up the time required to perform a Montgomery product calculation by applying the High-Radix Montgomery method on computing hardware. A loop of operations is performed consisting in repeating successive operations, i.e.: a first addition operation involving the addition of a value of one of several first products, designated ai·b and a value of one variable, designated u, according to a first relationship u:=u+ai·b; and a second addition operation involving the addition of a value of one of several second products, designated m·n, and a value of variable u according to a second relationship u:=u+m·n. At least the first and second addition operations are Carry-Save addition operations in order to speed up the time required to perform an addition.

45 Claims, 5 Drawing Sheets

OTHER PUBLICATIONS

Koc, CK et al: Carry-Save Adders for Computing the Product AB Modulo N, Electronics Letters, IEE Stevenage, GB, vol. 26, No. 13, Jun. 21, 1990, pp. 899-900, XP000107954, ISSN: 0013-5194, p. 899, Left Hand col. Line 36—p. 900, Lefthand col. Line 4.

Ploog H et al: FPGA Based Architecture Evaluation of Cryptographic Coprocessors for Smartcards; FPGAS for Custom Computing Machines, 1998, Proceedings, IEEE Symposium on Napa Valley, CA, USA Apr. 15-17, 1998, Lost Alamitos, CA, USA, IEEE Comput. Soc. US, Apr. 15, 1998, pp. 292-293, XP010298224 ISBN: 08186 8900-5, p. 292, Lefthand col. Line 13—Right Hand col. Line 10, p. 293, Lefthand col. Line10-Line 23.

Shand, M et al: Fast Implementations of RSA Cryptography, Computer Arithmetic, 1993, USA IEEE Comput. Soc. Jun. 29, 1993, pp. 252-259, XP010128541, ISBN: 0 8186 3862 1, p. 252, Left col., Line 1-p. 254, Right col., Line 25, p. 256, Left col,—Line 29-p. 257,Right col, Line 10; p. 258, Left col.,Line11-p. 259, Left col,LN 10.

Koc C K: Montgomery Reduction With Even Modulus; IEE Proceedings, vol. 141, No. 5 pp. 314-316-XP006001604; ISSN: 1350-2387; p. 314, Left col., Line 1-p. 315, Left col., Line 45, p. 315, Right col. Line 2-p. 316, Left col. Line 15.

Guinier D: Multiplication of Large Integers by the Use of Modular Arithmetic Application to Cryptography, SIG Security, vol. 7, No. 4, 1990, pp. 7-20, XP000925424; ISSN0277-920X; p. 8, Line 12-p. 9, Line 23, p. 10, Line 13-p. 18, Line 24, p. 18, Line 30-p. 19, Line 22.

Schindler W: A Timing Attack Against RSA With the Chinese Remainder Theorem; Cryptographic Hardware & Embedded Systems, Aug. 17-18, 2000 Proceedings, Lecture Notes in Computer Science, Berlin: Springer, DE, vol. 1965, Aug. 17, 2000; pp. 109-124, XP001049131; ISBN: 3-540-41455-X; p. 109, Line 12-p. 112, Line 20; p. 114, Line 24-p. 117, Line 16.

Koc CK et al: Fast Software Exponentiation in GF (2) Proceedings 13th IEEE Symp on Computer Arithmetic; Jul. 6, 1997; pp. 225-231, XP010241213; ISBN: 0-8186-7846-1; p. 225, Right col. Line 14-p. 228, Left col. Line 6.

Cetin Kaya KOC, Koc@ece.orst.edu, "High-Speed RSA Implementation" RSA Laboratories; RSA Data Security, Inc., 100 Marine Parkway, Ste. 500, Redwood City, CA 94065-1031; Version 2.0, Nov. 1994.

* cited by examiner

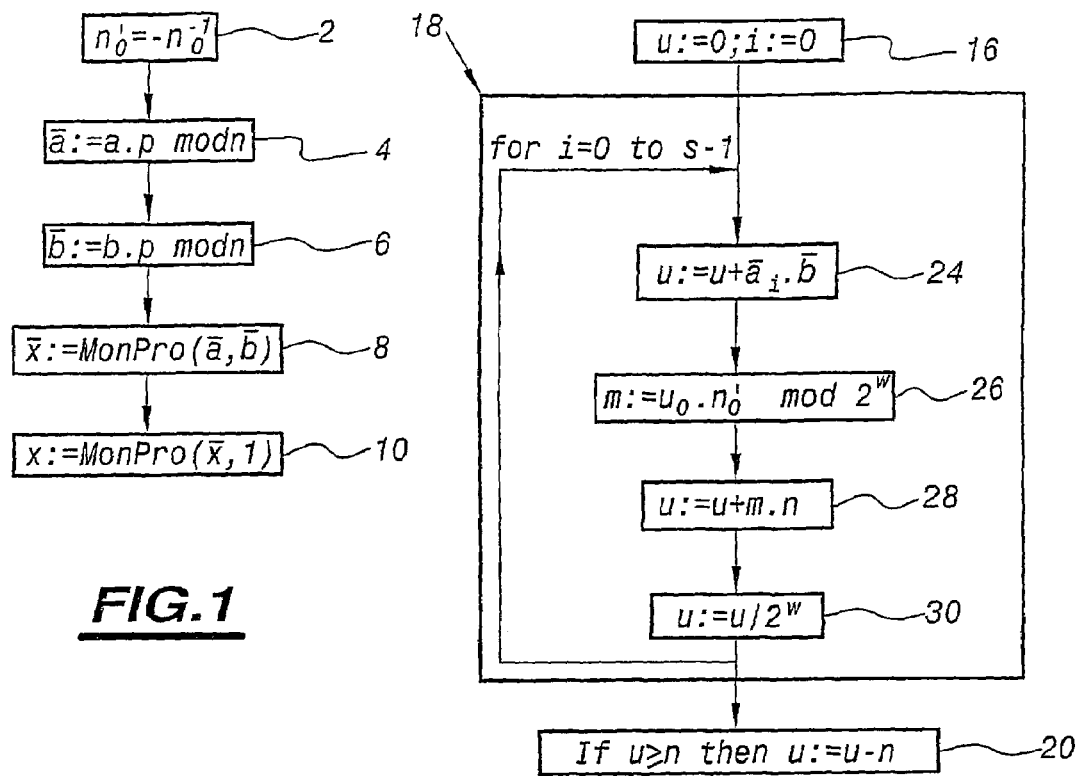
FIG.1
FIG.2
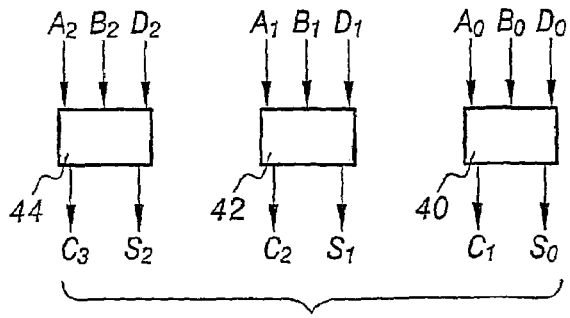
FIG.3A
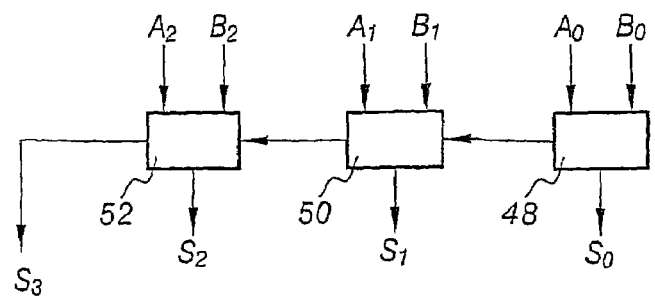
FIG.3B ary speed up the time required for performing a Montgomery product calculation, a multiplication and a modular exponentiation on a machine equipped with computing means.

METHOD AND DEVICE FOR REDUCING THE TIME REQUIRED TO PERFORM A PRODUCT, MULTIPLICATION AND MODULAR EXPONENTIATION CALCULATION USING THE MONTGOMERY METHOD

FIELD OF THE INVENTION

The invention relates to methods and devices for speeding up the time required to perform modular arithmetic operations, and more particularly a modular exponentiation, a modular multiplication and a Montgomery product on computing means.

BACKGROUND OF THE INVENTION

A modular multiplication operation consists of carrying out the following operation:

$$a \cdot b \bmod n;$$

where a, b and n are integers, n being called the modulus.

In a conventional manner, in order to effect a modular multiplication the computing means first of all carry out a multiplication of a by b, followed by modulo n reduction. The time for performing this operation is proportional to $k^2$ where k is the number of bits necessary in order to encode respectively a, b and n in binary form.

In a manner which is equally well known to mathematicians, a modular multiplication can be carried out by the Montgomery method. This method introduces Montgomery products as described in the document by Cetin Kaya Koç, "High Speed RSA Implementation", which may be obtained from the following address:

RSA Laboratories
RSA Data Security, Inc.
100, Marine Parkway, Suite 500
Redwood City, Calif. 94-65-1031
U.S.A.

In the following description this document will be referred to as D1. The subject matter of the document "High Speed RSA Implementation is hereby incorporated by reference in its entirety.

A modular exponentiation operation consists of carrying out the following operation:

$$x^c \bmod n;$$

where x, c and n are integers, n being the modulus.

The calculation of this exponentiation by known methods, such as for example the "square and multiply" method, involves k modular multiplications, k being the number of bits necessary in order to encode respectively x, c and n in binary form. Thus it is assumed that the time for performing this operation is proportional to $k^3$.

The modular exponentiation operations constitute basic operations of data encrypting/decrypting devices. For example, the encrypting/decrypting devices implementing the RSA (Rivest-Shamir-Adleman) use modular exponentiations.

These devices currently exist in various such as electronic components or electronic cards intended to be associated with computing means in order to perform and/or to speed up the encrypting/decrypting operations.

Electronic commerce, particularly on the Internet, uses a large number of these encrypting/decrypting devices in order to encrypt and decrypt commercial operations such as payments. The turnover of companies carrying out electronic commerce is therefore limited by the number of encrypting and decrypting operations which can be performed per second.

Consequently it will be imagined that it is important to speed up the time required for performing a Montgomery product calculation, a multiplication and a modular exponentiation on a machine equipped with computing means.

Therefore the object of the invention is to propose a method and a device for speeding up the time required to perform a Montgomery product calculation, a modular multiplication and a modular exponentiation on a machine equipped with computing means.

The invention therefore relates to a method for speeding up the time required to perform a Montgomery product calculation by applying the high-radix Montgomery method on computing hardware, the said method comprising a loop of operations consisting of reiterating successive operations, wherein in particular:

a first addition operation between a value of one of several first products, denoted $\bar{a}_r \cdot \bar{b}$ and a value of a variable, denoted u, according to a first relationship $u := u + \bar{a}_r \cdot \bar{b}$;

a second addition operation between a value of one of several second products, denoted $m \cdot n$, and a value of the variable u according to a second relationship $u := u + m \cdot n$;

characterised in that at least the said first and second addition operations are carry-save addition operations in order to speed up the time required for performing an addition.

According to other characteristics and advantages of the invention, the method comprises:

in a loop of operations a third operation of division of the variable u by a power of 2, denoted $2^\omega$, where $\omega$ is the radix, according to a third relationship $$u := \frac{u}{2^\omega},$$

characterised in that the variable u is registered in the form of a carry-save ordered pair formed by two variables, denoted C and S, for performing operations of the loop, and that the third operation of division of the variable u in the form of a carry-save ordered pair is carried out in two steps, namely:

a preliminary step of calculation and storage of a carry digit, denoted $R_e$, which is at risk of being lost by the division of each variable C and S by the power of 2;

a step of division of each variable C and S by the power of 2;

the preliminary step of calculation of the carry digit $R_e$ comprises the operation of adding in a conventional manner $\omega$ least significant bits of the variable C, denoted $C_0$, to $\omega$ least significant bits of the variable S, denoted $S_0$, according to a fourth relationship $R_e := C_0 + S_0$;

a recombination of u on the basis of the variables C and S of the carry-save ordered pair and of the carry digit $R_e$ comprises the operation of shifting to the right by $\omega$ bits the carry digit $R_e$ and in a conventional manner adding the result obtained to the variables C and S according to a fifth relationship $u := C + S + R_e/2^\omega$;

it comprises at the end of performing the loop of operations:

a step of recombination (84) of the variable u on the basis of at least the values of the variables C and S of the carry-save ordered pair calculated during the performance of the loop of operations, and a step of reduction (86) of the variable u according to a sixth relationship u:=u−n, where n is a modulus, the said steps of recombination of and of reduction of the variable u overlapping in such a way as to speed up the time required to perform them;

the radix ω is equal to 4 bits in order to optimise the time required for performing the calculation of a Montgomery product on the input variables of the Montgomery product encoded on 512 or 1024 bits;

the first products $\bar{a}_i \cdot \bar{b}$ are pre-calculated before performing the loop of operations; and the second products m·n are pre-calculated before performing the loop of operations.

The invention also relates to a method of speeding up the time required to perform the calculation of a first and a second Montgomery product by applying for each product a method including at least one first step during which the first addition operation for the first product is carried out at the same time as the second addition operation for the second product.

According to other characteristics and advantages of this method for speeding up the time required to perform the calculation of a first and a second Montgomery product:

it comprises at least a second step shifted in time with respect to the first, during which the second addition operation for the first product is carried out at the same time as the first addition operation for the second product;

it comprises at the end of performing the loop of operations:

a step of recombination then of reduction for the first product performed first; and then, a step of recombination then of reduction for the second product performed second;

one of the input variables of the first Montgomery product performed first is made up of the least significant bits of a variable, and one of the input variables of the second Montgomery product performed second is made up of the most significant bits of this same variable.

The invention also relates to a method of speeding up the time required for performing a modular multiplication calculation by applying a method implementing Montgomery products, characterised in that the calculation of the Montgomery products is carried out by applying at least one of the methods according to the invention.

According to other characteristics and advantages of this method for speeding up the time required for performing a modular multiplication calculation:

the said method implementing Montgomery products is the Montgomery method.

SUMMARY OF THE INVENTION

The invention also relates to a method of speeding up the time required for performing a modular exponentiation calculation by applying a method implementing modular multiplications, the calculation of the modular multiplications being carried out by applying a method according to the invention.

According to other characteristics and advantages of this method of speeding up the time required for performing a modular exponentiation calculation:

the said method implementing modular multiplications is the m-ary method with a word size of r bits;

the word size r of the m-ary method is equal to 5 bits in order to speed up the time for performing the m-ary method when input variables of the modular exponentiation calculation are encoded on 512 or 1024 bits;

the second products m·n are pre-calculated before applying the m-ary method;

the said method implementing modular multiplications is the Chinese remainders method.

The invention also relates to a method of speeding up the time required for performing a first modular exponentiation calculation by applying a method implementing second modular exponentiations, the second modular exponentiations being carried out by applying a method according to the invention.

According to other characteristics and advantages of this method of speeding up the time for performing the calculation of a first exponentiation:

the said method implementing second modular exponentiations is the Chinese remainders method;

it is applied to numbers encoded on more than 320 bits.

The invention also relates to a computer programme comprising programme code instructions for performing certain steps of the method according to the invention when the said programme is executed on principal computing means associated with the said computing hardware.

The invention also relates to a system for speeding up the time required to perform a Montgomery product calculation using the high-radix Montogomery method on computing hardware, the said system comprising:

means for effecting a first addition operation between a value of one of several first products, denoted $\bar{a}_i \cdot \bar{b}$, and a value of a variable, denoted u, according to a first relationship u:=$\bar{a}_i \cdot \bar{b}$;

means for effecting a second addition operation between a value of one of several second products, denoted m·n, and a value of the variable u according to a second relationship u:=u+m·n, characterised in that the means for effecting the first and the second addition operations include at least one carry-save adder;

according to other characteristics and advantages of this system:

the means for effecting the first and the second addition operations include at least one first carry-save adder adapted to carry out the first addition operation and a second carry-save adder (158; 232) adapted to carry out the second addition operation;

it includes conventional means for carrying out a third operation of division of the variable u by a power of 2, denoted $2^\omega$, where ω is the radix, according to a third relationship $$u := \frac{u}{2^\omega},$$

it includes means for storing the variable u in the form of a carry-save ordered pair formed by two variables, denoted C and S, and means for carrying out the third operation of division of the variable u in the form of a carry-save ordered pair comprising:

means for calculation and storage of a carry digit, denoted $R_e$, which is at risk of being lost by the division of each variable C and S by the power of 2;

means for division of each variable C and S by the power of 2;

the means for calculation and storage of the carry digit $R_e$ include means for conventional addition of the ω least significant bits of the variable C, denoted $C_0$, to the ω least significant bits of the variable S, denoted $S_0$, according to a fourth relationship $R_e := C_0 + S_0$;

it comprises:
means for recombination of the variable u at least on the basis of the values of the variables C and S of the carry-save ordered pair;
means for reduction of the variable u, the said means for recombination of the variable u and the said means for reduction being connected to one another in such a way that operation thereof overlaps under the control of the control means;
the radix ω is equal to 4 bits in order to optimise the time required to perform a Montgomery product calculation on input variables of the Montgomery product encoded on 512 or 1024 bits;
it includes means for pre-calculation of the first products $\bar{a}_i \cdot \bar{b}$;
it includes means for pre-calculation of the second products m·n;
the said means for pre-calculation of the first and/or the second products include a conventional adder.

The invention also relates to a system for speeding up the time required to perform the calculation of a first and a second Montgomery product, characterised in that it includes two carry-save adders which are activated simultaneously;

According to another characteristic of the system for speeding up the time required to perform the calculation of a first and a second Montgomery product, it includes a single means for recombining the variable u on the basis of at least the values of the variables C and S of the carry-save ordered pair, connected to the input of a single means for reduction of the variable u.

The invention also relates to a system for speeding up the time required to perform a modular multiplication calculation by a method implementing Montgomery products, the said Montgomery product calculations being performed on computing hardware, characterised in that it includes at least one system for speeding up the time required to perform the calculation of the Montgomery products according to the invention.

The invention also relates to a system for speeding up the time required to perform a modular multiplication calculation by the Montgomery method implementing Montgomery products on computing hardware, characterised in that it includes at least one system for speeding up the time required to perform the calculation of the Montgomery products.

The invention also relates to a system for speeding up the time required to perform a modular exponentiation calculation by a method implementing modular multiplications, characterised in that it includes at least one system for speeding up the time required to perform the calculation of the modular multiplications according to the invention.

The invention also relates to a system for speeding up the time required to perform a modular exponentiation calculation by the m-ary method with a word size of r bits implementing modular multiplications, characterised in that it includes at least one system for speeding up the time required to perform the calculation of the modular multiplications according to the invention.

According to another characteristic of the system for speeding up the time required to perform the modular exponentiation calculation by the m-ary method, it includes at least one register for shifting 5 bits to the left in order to speed up the performance of the m-ary method with a word size of r bits of the m-ary method equal to 5 bits.

The invention also relates to a system for speeding up the time required to perform the calculation of a modular exponentiation by the Chinese remainders method implementing modular multiplications, characterised in that it includes at least one system for speeding up the time required to perform the modular multiplication calculation according to the invention.

The invention also relates to a system for speeding up the time required to perform the calculation of a first modular exponentiation by a method implementing second modular exponentiations, characterised in that it includes at least one system for speeding up the time required to perform the calculation of the second modular exponentiations according to the invention.

The invention also relates to a system for speeding up the time required to perform at least a first modular exponentiation calculation by the Chinese remainders method which itself implements second modular exponentiations, characterised in that it includes at least one system for speeding up the time required to perform the calculation of the second modular exponentiations according to the invention.

The invention also relates to an electronic component which includes at least one system according to the invention.

According to another characteristic of this component, it is formed with at least one FPGA.

The invention also relates to an electronic card which includes at least one system according to the invention.

According to another characteristic of this electronic card, it conforms to the PCI standard.

The invention also relates to a machine characterised in that it is associated with at least one system according to the invention.

The invention also relates to a method of speeding up the time required to perform the calculation of a first modular exponentiation, denoted $M^E$ mod n, where M is the input message, E is the exponent and n is the modulus, on principal computing means, characterised in that it further comprises:
a first step of separating the calculation of the first modular exponentiation into two second modular exponentiations by applying the Chinese remainders method,
a second step consisting of calculating each of the second modular exponentiations by applying the m-ary method which implements modular multiplications,
steps consisting of effecting the modular multiplications by applying a method implementing Montgomery products.

According to other characteristics and advantages of this method for speeding up the time required to perform the calculation of a first modular exponentiation:
the input variables are natural integers encoded on more than 320 bits;
the word size r of the m-ary method is equal to 5 bits in order to speed up the time required to perform the m-ary method when the input variables of the calculation of the modular exponentiation are encoded on 512 or 1024 bits;
the calculations of the second modular exponentiations are carried out substantially in parallel; and
the Montgomery products are calculated using the high-radix Montgomery method.

The high-radix Montgomery method is implemented in accordance with one of the methods according to the invention.

The invention also relates to a computer programme comprising programme code instructions for performing certain steps of a method according to the invention when the said programme is executed on the principal computing means.

BRIEF DESCRIPTION OF THE DRAWINGS

The invention will be better understood upon reading the following description which is given solely by way of example and with reference to the accompanying drawings, in which:

FIG. 1 shows the Montgomery method for carrying out a modular multiplication;

FIG. 2 shows a method of calculating a Montgomery product in its high-radix form;

FIG. 3A is an electronic diagram of a carry-save adder;

FIG. 3B is an electronic diagram of a conventional adder;

DETAILED DESCRIPTION

Figures 4, 5:
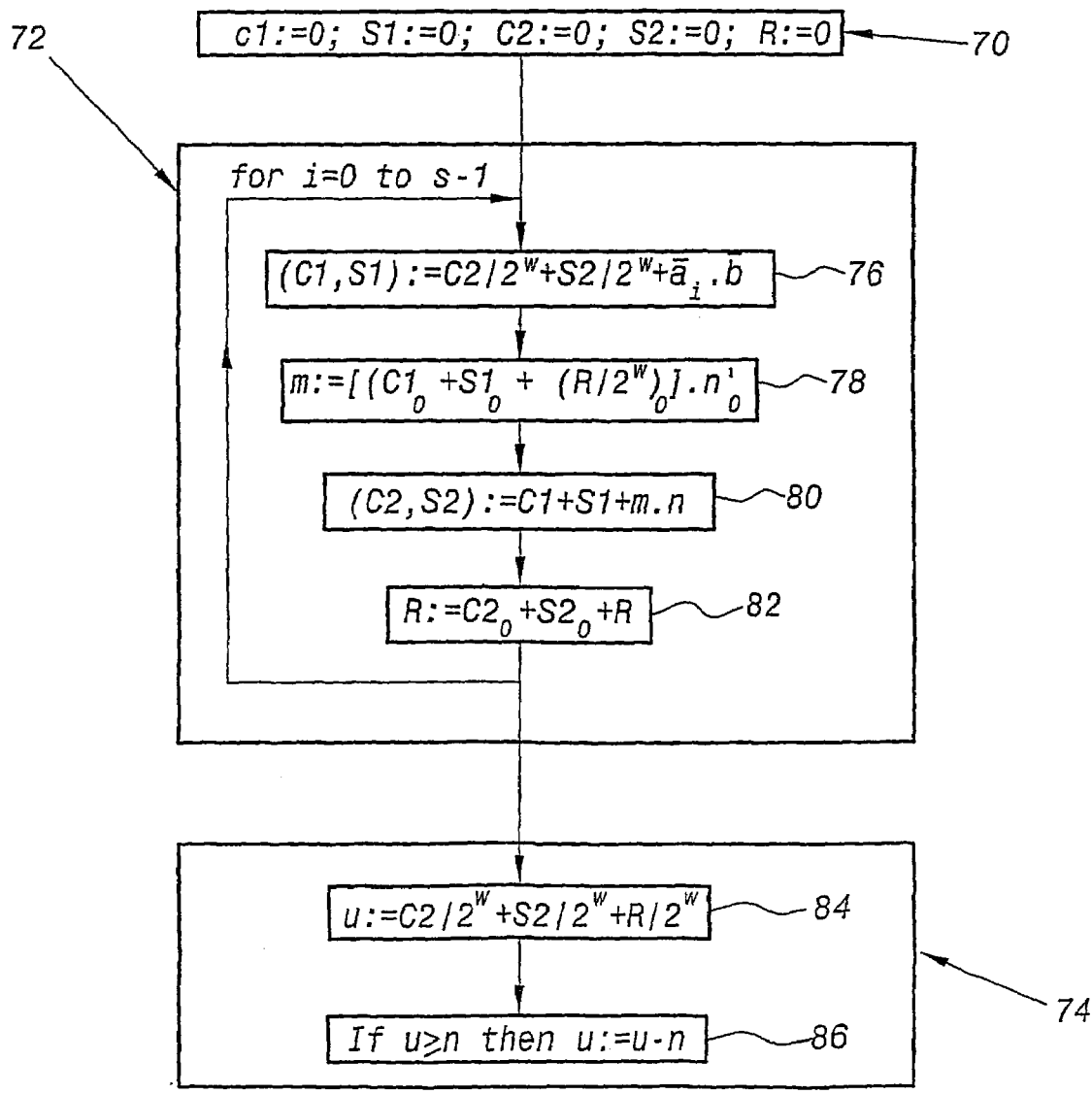
FIG. 4 is an example of division of a number represented in the form of a carry-save ordered pair.
FIG. 5 shows a method of calculating a Montgomery product according to the invention.

The following notations are used in the description which follows:

D2 denotes the following document: Cetin Kaya Koç, "RSA Hardware Implementation", which may be obtained from the same address as the previously mentioned document D1;

:= is the allocation symbol, thus X:=M signifies that the value of a variable denoted M is allocated to a variable denoted X;

"dec" indicates that the digit which precedes it is in decimal notation;

"FPGA component" refers to the known programmable component of the FPGA (field programmable gate array) type.

FIG. 1 shows the Montgomery method for carrying out a modular multiplication between a first input variable denoted "a" and a second input variable denoted "b" according to the following relationship:

$$a \cdot b \bmod n;$$

where a, b and n are natural integers, n being the modulus.

The following description of this method only presents the information necessary for an understanding of the invention. For further information the reader may refer, for example, to the document D1, chapter 3.8 "Montgomery's method".

The modular multiplication according to the Montgomery method is carried out in five successive steps number 2, 4, 6, 8 and 10 on FIG. 1.

The step 2 consists of calculating the variable $n'_0$ according to the following relationship:

$$n'_0 = -n_0^{-1};$$

where:

the sign − represents the operation of complement to 1;

$n_0$ represents the $\omega$ least significant bits of the modulus n, $\omega$ being called the radix;

$n_0^{-1}$ represents the inverse of $n_0$ and is defined by the relationship $n_0 \cdot n_0^{-1} = 1 \bmod (2^\omega)$, this equation being solved by known methods such as the extended Euclidean algorithm.

The significance of the calculation of $n'_0$ in this step will become apparent upon reading the description of FIG. 2.

In the second step 4 the Montgomery remainder of the input variable a, denoted $\bar{a}$, is calculated according to the following relationship:

$$\bar{a} := a \cdot p \bmod n$$

where:

a is the first input variable of the modular product;

n is the modulus of the modular product;

p is defined by the following relationship: $p = 2^k$, where k is the natural integer such that: $2^{k-1} \leq n < 2^k$.

In the third step 6 the Montgomery remainder of the input variable b, denoted $\bar{b}$, is calculated according to the following relationship:

$$\bar{b} := b \cdot p \bmod n;$$

where:

b is the second input variable of the modular product;

n is the modulus;

p is identical to the variable p defined in the second step 4.

In the fourth step 8 the Montgomery product between the remainder $\bar{a}$ and the remainder $\bar{b}$ is calculated and the result is allocated to a variable $\bar{x}$ according to the following relationship:

$$\bar{x} := MonPro(\bar{a}, \bar{b});$$

where:

$\bar{a}$ and $\bar{b}$ are the remainders calculated respectively at steps 4 and 6;

MonPro represents the Montgomery product operation between the variables $\bar{a}$ and $\bar{b}$. This operation will be described later with regard to FIG. 2.

In the fifth step 10 the Montgomery product between the variable $\bar{x}$ and the unit is calculated and the result is allocated to a variable x according to the following relationship:

$$x := MonPro(\bar{x}, 1);$$

where:

$\bar{x}$ is the variable calculated at the fourth step 8;

1 represents the unit;

MonPro represents the Montgomery product operation.

At the end of the five steps 2, 4, 6, 8 and 10 the result of the multiplication of the first variable a by the second variable b modulo n is obtained in the variable x.

FIG. 2 shows the Montgomery method in its high-radix form for calculating a Montgomery product, also referred to here as the high-radix Montgomery method.

The following description of this method only presents the information necessary for an understanding of the invention. For further information the reader may refer, for example, to the document D2, chapter 7.5 "High radix Montgomery's method".

The calculation of a Montgomery product corresponds to the MonPro operations of FIG. 1. This operation will be presented in the particular case of step 8 of FIG. 1, that is to say that the following calculation is described here:

$$MonPro(\bar{a}, \bar{b}) = \bar{a} \cdot \bar{b} \cdot p^{-1} \bmod n;$$

where:
- $\bar{a}$ and $\bar{b}$ are the respective Montgomery remainders of the variables a and b calculated at steps 4 and 6 of FIG. 1;
- $p^{-1}$ is the modulo n inverse of the variable p defined during the description of step 4 such that $p^{-1}$ satisfies the following relationship: $p \cdot p^{-1} = 1 \mod n$.

This method has three principal steps 16, 18 and 20. The first step 16 consists of initialising a variable u and an index i according to the following relationships: u:=0; i:=0. It also consists of pre-calculating first products $\bar{a}_i \cdot \bar{b}$ which will be defined with regard to operation 24 of this method.

The second step 18 consists of repeating a loop of operations as long as the index i is not less than or equal to a variable s−1, the index i being incremented at the end of each iteration of the loop. This loop of operations is' denoted in a conventional manner "for i=0 to s−1". The variable s which determines the number of iterations is defined here by the following relationship:

$$k := s/\omega;$$

where:
- k represents the number of bits necessary to encode the modulus n, that is to say that k satisfies the relationship: $2^{k-1} \leq n < 2^k$;
- $\omega$ is the radix.

Thus if for example k=512 bits and if the radix $\omega$=4 bits, s=128.

Moreover, if the division of k by the radix $\omega$ does not give a natural integer, it is possible to add to the binary representation of the modulus n most significant bits equal to 0 in such a way that the binary representation of the modulus n thus obtained contains a number of bits k' which is a multiple of the radix $\omega$.

The loop of operations 18 includes four successive operations 24, 26, 28 and 30.

The first operation 24 of the loop of operations 18 consists of carrying out a first operation of addition and allocating the result to the variable u according to the following relationship:

$$u := u + \bar{a}_i \cdot \bar{b};$$

where:
- $\bar{a}_i$ represents the $\omega$ least significant bits of the variable $\bar{a}$ after a $i^{th}$ shift to the right of $\omega$ bits of the binary representation of $\bar{a}$, i corresponding to the index i of the variable $\bar{a}_i$;
- $\bar{b}$ represents the Montgomery remainder of the input variable b;
- u is the variable initialised during step 16.

All of the values of the products $\bar{a}_i \cdot \bar{b}$ when the value of the index i varies from 0 to 2−1 will be called hereafter "the first products".

The operation 26 consists of allocating to a variable m the result of the multiplication of a variable $u_0$ by $n'_0$ modulo $2^\omega$ according to the following relationship:

$$m := u_0 \cdot n'_0 \mod 2^\omega;$$

where:
- $u_0$ represents the $\omega$ least significant bits of the variable u previously calculated during the operation 24:
- $n'_0$ is the variable calculated during the step 2 of the method of FIG. 1;
- $\omega$ is the radix.

The operation 28 consists of carrying out a second operation of addition then allocating the result to the variable u according to the following relationship:

$$u := u + m \cdot n$$

where:
- u is the variable previously defined;
- m is the variable calculated during the operation 26;
- n is the modulus of the modular multiplication of FIG. 1.

All of the possible values of the products m·n when the value of m varies from 0 to $2^\omega - 1$ will be referred to hereafter as "the second products".

The operation 30 consists of carrying out an operation of division of the variable u by a power of 2, the allocating the result of the division to the variable u according to the following relationship:

$$u := u/2^\omega$$

where:
- u is the variable previously calculated;
- $2^\omega$ is the power of 2, $\omega$ being the radix.

At the end of the loop of operations 18, the step 20 is performed. This step consists of carrying out an operation of reduction if the value of the variable u obtained at the end of the loop of operations 18 is greater than n, n being the modulus. The reduction operation consists of allocating to the variable u the result of the subtraction u minus n according to the following relationship:

$$u := u - n$$

where u and n are respectively the value calculated during the loop of operations 18 and the modulus of the modular multiplication of FIG. 1.

It will be noted that the Montgomery method described in FIGS. 1 and 2 transforms modulo n multiplications into modulo $2^\omega$ multiplications. The modulo $2^\omega$ multiplications are performed much more quickly on conventional computing means. However, it is known that this gain in speed at the level of the modular multiplications is counterbalanced by the slowness of the calculation of the remainders $\bar{a}$ and $\bar{b}$ during steps 4 and 6 of FIG. 1.

The high-radix Montgomery method is currently used with a radix value equal to 8, this value corresponding to a byte (8-bit word). Surprisingly it was determined by tests that this radix value was not the optimum for speeding up the time required to perform the calculation of a high-radix Montgomery product in the following conditions:
- the calculation is carried out on large numbers. The designation "large numbers" is intended to mean natural integers encoded in binary form on at least 320 bits.
- the calculation is carried out by computing hardware. The designation "computing hardware" is intended here to mean electronic components, or sets of electronic components specially designed to carry out the calculation. Polyvalent computing means, such as a conventional computer associated with a programme enabling this calculation to be carried out, are effectively excluded from this hardware.

The following tests were carried out for variables a, b and n encoded in binary form on 512 bits, that is to say for a value of the variable k, previously defined, equal to 512 bits. The tests consist in a first step of designing hardware for calculation of a Montgomery product according to the method of FIG. 2. In a second step the test consist of determining the time required to perform a calculation of a Montgomery product according to the method of FIG. 2 on computing hardware designed during the first step and for the maximum operating frequency of this hardware. Thus it will be noted in the following numerical examples that the maximum operating frequency of the hardware decreases as the value of the radix ω increases. For the following numerical results the computing hardware is formed with a FPGA (field programmable gate array) component having the reference 10K200E-1. In these conditions the results obtained are as follows:

For a radix ω equal to 2 bits, the maximum operating frequency of the computing hardware is 66 MHz. The time required to perform a Montgomery product calculation according to the method of FIG. 2 is 8280 nanoseconds.

For a radix ω equal to 3 bits, the maximum operating frequency of the computing hardware is 60 MHz. The time required to perform a Montgomery product calculation according to the method of FIG. 2 is 6447 nanoseconds.

For a radix ω equal to 4 bits, the maximum operating frequency of the computing hardware is 50 MHz. The time required to perform a Montgomery product calculation according to the method of FIG. 2 is 5940 nanoseconds.

For a radix ω equal to 5 bits, the maximum operating frequency of the computing hardware is 40 MHz. The time required to perform a Montgomery product calculation according to the method of FIG. 2 is 6475 nanoseconds.

Therefore it will be appreciated upon reading the results of these tests that in order to optimise the time required to perform a Montgomery product calculation according to the method of FIG. 2 for large numbers encoded on 512 bits the radix must be chosen to be equal to 4 bits.

In a similar fashion it has been determined that a value of the radix equal to 4 bits also makes it possible to optimise the time required to perform the calculation of a Montgomery product according to the method of FIG. 2 for large numbers encoded on 1024 bits.

There is another method in existence for calculating the Montgomery products which is known by the name of "Montgomery method in its simple form". This method corresponds to the high-radix Montgomery method in the case where the radix is equal to 1 bit. Consequently this method will not be described in greater detail here, and it will simply be considered that the high-radix Montgomery method also includes the case where the radix is equal o 1 bit.

FIGS. 3A and 3B show an electronic diagram of a carry-save adder and an electronic diagram of a conventional adder.

On the diagrams $A_i$, $B_i$, $D_i$, $C_i$ and $S_i$ denote respectively the $i^{th}$ bits starting from the right of the binary representation of variables A, B, D, C and S, the bit furthest to the right of each representation having an index i equal to zero.

The carry-save adder of FIG. 3A comprises three cells 40, 42 and 44. These cells 40, 42 and 44 are respectively connected at the input to first means (not shown) for storage of the bits $A_0$, $B_0$ and $D_0$, the bits $A_1$, $B_1$, and $D_1$ and the bits $A_2$, $B_2$ and $D_2$ of the input variables A, B and D. They are also connected at the output respectively to second means (not shown) for storage of the bits $C_1$ and $S_0$, $C_2$ and $S_1$, and $C_3$ and $S_2$ of the output variables C and S.

The cell 40 is adapted to calculate the value of the bit $S_0$ according to the following relationship:

$$S_0 := A_0 \oplus B_0 \oplus D_0$$

where:
$A_0$, $B_0$ and $D_0$ are input bits of the cell;
$\oplus$ represents the logical operation "exclusive OR".

The cell 40 is also adapted to calculate the value of the bit $C_1$ according to the following relationship:

$$C_1 := A_0 \cdot B_0 + A_0 \cdot D_0 + B_0 \cdot D_0$$

where:
$A_0$, $B_0$ and $D_0$ are defined above;
+ represents the logical operation "OR";
· represents the logical operation "AND".

In a manner similar to the cell 40 the cell 42 is adapted to calculate the output bits $C_2$ and $S_1$ according to the following two relationships:

$$S_1 := A_1 \oplus B_1 \oplus D_1;$$

$$C_2 := A_1 \cdot B_1 + A_1 \cdot D_1 + B_1 \cdot D_1.$$

In a manner similar to the cells 40 and 42, the cell 44 is adapted to calculate the output bits $S_2$ and $C_3$ according to the following two relationships:

$$S_2 := A_2 \oplus B_2 \oplus D_2;$$

$$C_3 := A_2 \cdot B_2 + A_2 \cdot D_2 + B_2 \cdot D_2.$$

The operation which consists of calculating the output bits of the variables S and C as a function of the input bits according to the preceding relationships is called a carry-save addition.

It will be noted that at the output of the carry-save adder, the result of the addition of the three input variables A, B and D is registered in the two output variables C and S, C and S forming what is called a carry-save ordered pair, denoted (C, S). In order to obtain the result of the addition of the three input variables A, B and D in one single variable U, the variables C and S must be recombined according to the following relationship:

$$U := C + S$$

where:
C and S are the variables of the carry-save ordered pair obtained at the output of the carry-save adder;
+ represents the conventional addition operation.

The method consisting of adding the bits of the input variables according to the preceding relationships in order to obtain a carry-save ordered pair, then recombining the variables of the carry-save ordered pair in order to obtain the final result of the addition of the input variables is known by the name of "the carry-save method". Thus the carry-save method is made up of an operation of carry-save addition followed by an operation of recombination of the carry-save ordered pair.

The time required to perform the calculation of $C_1$ and $S_0$ by the cell 40 is denoted λ. It is assumed that the time required to perform the calculation of $C_2$ and $S_1$ and of $C_3$ and $S_2$ by their respective cells 42 and 44 is also equal to λ. In these conditions the time required to perform the carry-save addition between the three input variables A, B and D is equal to λ. In fact the bits of the binary representations of the variables A, B and D are processed in parallel by the cells 40, 42 and 44. This result can be generalised for carry-save adders including numerous cells, in such a way as to be able to carry out carry-save additions on large numbers as defined previously.

It will be noted that a carry-save adder can also be provided by software such as a programme permitting processing in parallel of the carry-save addition operations.

FIG. 3B shows a conventional adder adapted to carry out the conventional addition of two input variables A and B and to store the result in an output variable S.

This conventional adder comprises three cells 48, 50, 52.

The cell 48 is connected to the output of first means (not shown) for storage of the bits $A_0$ and $B_0$ and to the input of second means (not shown) for storing the bit $S_0$. It is also connected to an input of the cell 50. This call 48 is adapted to add the bits $A_0$ and $B_0$ in a conventional manner and to transmit the carry digit of this addition to the cell 50. The result of this addition is stored in the second means for storage of the bit $S_0$.

The cell 50 is connected to the output of first means (not shown) for storage of the bits $A_1$ and $B_1$ and to the input of second means (not shown) for storage of the bit $S_1$. It is also connected to an input of the cell 52. This cell 50 is adapted to add the bits $A_1$ and $B_1$ in a conventional manner and to transmit the carry digit of this addition to the cell 52. The result of this addition is stored in the second means for storage of the bit $S_1$.

The cell 52 is connected to the output of first means (not shown) for storage of the bits $A_2$ and $B_2$ and to the input of second means (not shown) for storage of the bits $S_2$ and $S_3$. This cell 52 is adapted to add the bits $A_2$ and $B_2$, the result and the carry digit of this addition being stored in the second means for storage, in the bits $S_2$ and $S_3$ respectively.

The time required to perform the calculation $S_0$ by the cell 48 is denoted $\lambda$ and it is assumed that the time required to perform the calculation of $S_1$ and of $S_2$, $S_3$ respectively by the cells 50 and 52 is identical to that of the cell 48. It will be noted upon reading the description of this conventional adder that the performance of the calculation of $S_1$ by the cell 50 can only commence when the cell 48 has transmitted the carry digit of the addition of the bits $A_0$ and $B_0$, that is to say when the calculation of $S_0$ is terminated. Likewise, the performance of the calculation of $S_2$, $S_3$ by the cell 52 can only commence when the cell 50 has finished the calculation of $S_1$. Consequently, the addition of the two input variables A, B by the adder of FIG. 3B necessitates a time to perform it of 3 $\lambda$.

Therefore it will be appreciated that in order to add three input variables A, B and D with the aid of the conventional adder of FIG. 3B, the time required to perform the calculation is $3\lambda$ for a first addition of A to B to which it is appropriate to add 3 $\lambda$, corresponding to the time required to perform a second addition between the result of the first addition and the variable D. Thus to carry out an addition between three input variable A, B and D with the aid of this conventional adder necessitates a time of $6\lambda$.

With the aid of this simplified example it is established that the time required to perform a conventional addition is proportional to the numbers of bits of the input variables.

By way of comparison it may be assumed that the performance time $\lambda$ is the same for the cells 40, 42, 44, 48, 50 and 52 of FIGS. 3A and 3B. Thus a carry-save addition between the variables A, B and D with the aid of the carry-save adder is performed in a time $\lambda$. In order to obtain the results of the addition in one single variable, the variables C and S must be recombined by carrying out a conventional addition operation between them which is performed in a time $3\lambda$. The total time required to perform the addition of the variables A, B and D using a carry-save adder is then equal to $4\lambda$, as against $6\lambda$ in the case where only conventional adders are used.

It will also be appreciated upon reading the preceding description that the gain in time achieved by virtue of the use of carry-save adders is all the more substantial as the additions are carried out on large numbers. In fact, the time required to perform a conventional addition is proportional to the number of bits of the input variables, which is not the case for a carry-save addition.

However, it is known that the use of carry-save adders is only useful in order to carry out additions between three input variables. Moreover, the result obtained at the output of a carry-save adder is presented in the form of a carry-save ordered pair which necessitates recombination of the output variables C and S by a conventional addition, thus limiting the usefulness of a carry-save adder. It has also been appreciated that it is difficult to carry out arithmetic operations on a variable represented in the form of a carry-save ordered pair. For example it is not possible simply to carry out an operation of division by a power of 2, denoted $2^\omega$, of a carry-save ordered pair according to the following relationship:

$$(C, S)/2^\omega := (C/2^\omega, S/2^\omega)$$

where C and S are the variables of the carry-save ordered pair.

This difficulty is illustrated on the example of FIG. 4 where:

$$C = 0110\ 0000\ 0010;\ \text{and}$$

$$S = 01001001\ 1110.$$

By recombination of the variables C and S according to the relationship C+S the following result is obtained:

$$C + S = 10101010\ 0000 (= 680\ dec).$$

By division of the recombined carry-save ordered pair C+S by a power of 2, in this case 16, the following result is then obtained:

$$(C+S)/16 = 10101010 (= 170\ dec).$$

Now, if the same calculation is carried out but with the order of the operations reversed, that is to say that first of all the division operation and then the recombination operation is carried out, then the following numerical results are obtained in succession:

$$C/16 = 0110\ 0000;$$

$$S/16 = 0100\ 1001;$$

$$C/16 + S/16 = 1010\ 1001 (= 169\ dec).$$

It will therefore be noted that the simple division of each variable C and S by a power of two does not permit the exact result to be obtained. It is therefore necessary to recombine the carry-save ordered pair (C, S) before performing a division of a variable stored in the form of a carry-save ordered pair. No known solution to this problem exists in the current prior art.

Upon reading the known drawbacks of the carry-save adders, it will be appreciated that it is not obvious to use these adders within the framework of the calculation of a Montgomery product. In fact, the known methods of calculation of a Montgomery product only involve addition operations between two variables and not three. Furthermore, these known methods include, particularly in the case of the high-radix method, arithmetic operations which cannot be carried out on carry-save pairs, such as the operation 30 of FIG. 2.

FIG. 5 shows a method according to the invention for calculation of a Montgomery product between two input variables, denoted $\bar{a}$ and $\bar{b}$, corresponding to the remainders calculated during the steps 4 and 6 of the method of FIG. 1. In order to present this method, the same notations are used as those defined with regard to FIG. 2.

FIG. 5 comprises three successive principal steps 70, 72 and 74, the step 70 being a step of initialisation, the step 72 being a step of iteration of a loop of operations, and the step 74 being a step of recombination and reduction of the result.

The initialisation step 70 consists of initialising the variables necessary for the calculation of the Montgomery product according to the following relationships:

$C1:=0;$ $S1:=0;$ $C2:=0;$ $S2:=0;$ $R:=0;$ where:
C1 and S1 are variables of a first carry-save ordered pair denoted (C1, S1);
C2 and S2 are variables of a second carry-save ordered pair denoted (C2, S2);
R is a variable for storage and cumulative totalling of carry digits, the significance of which will become apparent upon reading the following description.

The step 70 also consists of pre-calculating the first products $\bar{a}_i \cdot \bar{b}$ defined with regard to the operation 24 of FIG. 2.

For this, $\bar{b}$ is multiplied by all the possible values of $\bar{a}_i$, that is to say the natural integers between 0 and $2^\omega - 1$.

The second step 72 consists of reiterating a loop of operations as long as an index, denoted i, is not greater than or equal to a variable $s-1$, the index i being incremented at the end of each iteration of the loop. This loop of operations is denoted in a conventional manner "for i=0 to $2-1$". The variable s which determines the number of iterations is defined in an analogous manner to that of step 18 of FIG. 2.

The loop of operations 72 comprises four successive operations 76, 78, 80 and 82.

The operation 76 consists of carrying out a first operation of carry-save addition between the variables C2 divided by $2^\omega$, S2 divided by $2^\omega$ and one of the first products $\bar{a}_i \cdot \bar{b}$ defined with regard to the operation 24 of FIG. 2. This addition operation is carried out with the aid of a carry-save adder according to the following relationship:

$(C1, S1):=C2/2^\omega + S2/2^\omega + \bar{a}_i \cdot \bar{b}$ where:
$\omega$ is the radix;
(C1, S1) is the first carry-save ordered pair formed by the variables C1 and D1;
$\bar{a}_i \cdot \bar{b}$ is one of the first products;
C2 and S2 are the variables of the second carry-save ordered pair (C2, S2).

It will be noted that this operation 76 fulfils the same function as the operations 24 and 30 of FIG. 2, but the first addition operation is carried out with the aid of a carry-save adder.

The operation 78 consists of carrying out the conventional addition of the variables $C1_0$, $S1_0$ and $(R/2^\omega)_0$ and then allocating the result of this operation to a variable m, according to the following relationship:

$m:=(C1_0+S1_0+(R/2^\omega)_0) \cdot n'_0$ where:
$C1_0$ and $S1_0$ represent the $\omega$ least significant bits respectively of the variables C1 and S1, $\omega$ being the radix;
$(R/2^\omega)_0$ represents the $\omega$ least significant bits of the result of the division of R by $2^\omega$, $\omega$ being the radix;
$n'_0$ is the variable calculated during step 2 of the method of FIG. 1;
m is a variable in which the result is stored.

The operation 80 consists of carrying out a second operation of addition between the variables C1, S1 and one of the second products $m \cdot n$ defined with regard to the operation 28 of FIG. 2. This addition is carried out by a carry-save adder and the result is allocated to the variables C2, S2 of the second carry-save ordered pair according to the following relationship:

$(C2, S2):=C1+S1+m \cdot n$ where:
C1 and S1 are the variables previously calculated;
$m \cdot n$ is one of the second products;
S2 and C2 are the variables of the second carry-save ordered pair.

It will be noted that the operation 80 fulfils the same function as the second addition operation of FIG. 2, but it is carried out with the aid of a carry-save adder.

The operation 82 consists of calculating the variable R by adding the variables $C2_0$, $S2_0$, and the value of the variable R in a conventional manner. The result is allocated to the variable R according to the following relationship:

$R:=C2_0+S2_0+R$ where:
$C2_0$, $S2_0$ are respectively the $\omega$ least significant bits of the variables C2 and S2, $\omega$ being the radix;
R is the variable for storage and cumulative totalling of the carry digits.

In fact, it has been discovered that the difference in result between the operation $(C2+S2)/2^\omega$ and the operation $(C2/2^\omega + S2/2^\omega)$, as illustrated by the example of FIG. 4, is equal to the carry digit of the operation $C2_0+S2_0$. Therefore the carry digit of the operation $C2_0+S2_0$ is here called "the carry digit which is at risk of being lost by the division of each variable C2 and S2 by a power of 2, denoted $2^\omega$". Therefore this operation 82 calculates the carry digit which is at risk of being lost by the division of each variable C2 and S2 of the second carry-save ordered pair by the power $2^\omega$ during the operation 76. Furthermore, here the operation 82 cumulatively totals the carry digit of the addition of $C2_0+S2_0$ at each iteration of the loop of operations 72 for subsequent use in the step 74.

The step 74 of recombination and reduction is made up of a recombination operation 84 followed by a reduction operation 86.

The operation 84 consists of carrying out a conventional addition between the variable C2 divided by $2^\omega$, the variable S2 divided by $2^\omega$ and the variable R divided by $2^\omega$, the result being allocated to a variable u according to the following relationship:

$u:=C2/2^\omega + S2/2^\omega + R/2^\omega$ where:
$\omega$ is the radix;
C2, S2 and R are the variables previously calculated during the loop of operations 72;
u is a variable of storage of the result of the operation.

It will be noted that this operation is a combination of the following operations:
A division by $2^\omega$ of each variable of the carry-save ordered pair (C2, S2).
An operation of extraction from the cumulative totalling of the carry digits calculated during the execution of the loop of operations 72, this operation being carried out by shifting the variable R to the right by $\omega$ bits.

An operation of recombination of the second carry-save ordered pair (C2, S2) calculated during the execution of the loop of operations 72.

An operation of addition to the previously recombined second carry-save ordered pair of the cumulative total of the carry digits which would have been lost if they had not been stored and cumulatively totalled in the variable R during the execution of the loop of operations 72. Thus this operation makes it possible to restore the true value of the result at the end of the loop of operations 72 in spite of the operations of division of each variable of a carry-save ordered pair.

The operation 86 consists of carrying out a reduction operation if the variable u is greater than the modulus n according to the following relationship:

$$u:=u-n$$

where u is the result of the Montgomery product.

This operation is denoted in a conventional manner: "if $u \geq n$ then $u:=u-n$".

The method of calculation of a Montgomery product according to the invention is clearly faster than the known method of FIG. 2. In fact, the first and second addition operations 76 and 80 are carried out with the aid of carry-save adders, whilst in the known method the first and second addition operations 24 and 28 are carried out with the aid of at least one conventional adder. Furthermore, the method of FIG. 5 discloses a method of carrying out a division of a variable represented in the form of a carry-save ordered pair by a power of 2, which avoids a step of recombination of the carry-save ordered pair before performing this division. This speeding up of the time required to perform the Montgomery product calculation is all the more substantial as the input variables $\bar{a}$, $\bar{b}$ are larger, i.e. encoded on a substantial number of bits (greater than 320 bits).

It will be noted that the operations 78 and 82 include additions on small numbers encoded on ω bits and that an optimisation of the time required to perform these two operations has no significant effect.

Moreover, the operations 84 and 86 are carried out less frequently than the operations of the loop 72, and consequently an optimisation of the time required to perform them, whilst possible, has o more effect than that of the operations of the loop 72. However, in a variant these operations are speeded up. An embodiment of this variant will be presented with regard to FIG. 9.

In another variant, all of the second products m·n are calculated before the loop of operations 72 is executed and are stored in a memory. Thus the operations of calculating the first products $\bar{a}_i \cdot \bar{b}$ and the second products m·n during the loop of operations 72 are replaced by operations of selection of the results of these calculations in the said memory.

In a variant, the radix ω is chosen to be equal to 4 bits in such a way as to optimise the time required to perform the calculation of the Montgomery product between input variables encoded on 512 or 1024 bits on computing hardware. In fact, it has been determined in a manner similar to that described with regard to the method of FIG. 2 that for such input variables a value of the radix ω equal to 4 bits speeds up the time required to perform the Montgomery product calculation.

The embodiment will preferably be a combination of the method of FIG. 5 and the two variants described above.

Figure 6:
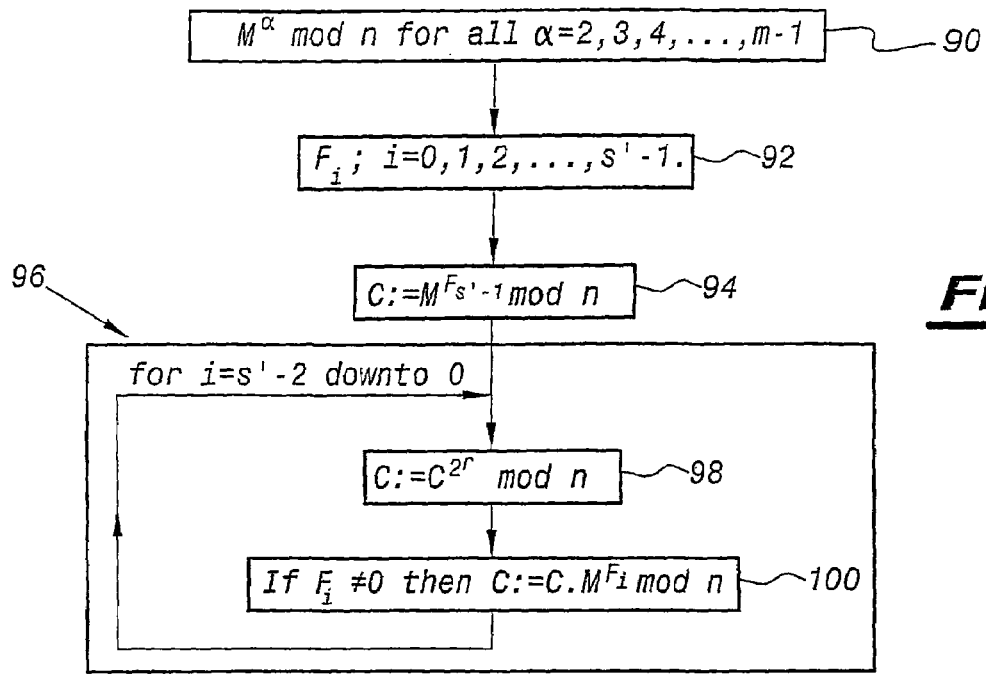
FIG. 6 shows a method of modular exponentiation according to the m-ary method.

FIG. 6 shows a method of calculation of a modular exponentiation according to the m-ary method in order to carry out the following calculation:

$$M^E \bmod n$$

where:
M, E and n are natural integers encoded in binary form on a maximum of k bits,
M is the message; E is the exponent; and n is the modulus.

The m-ary method of calculating a modular exponentiation is known, and therefore the description which follows only has the aim of introducing the elements necessary for an understanding of the invention. The reader may refer to document D1, chapter 2.4 "The m-ary Method" for more detailed information.

FIG. 6 includes four successive steps 90, 92, 94 and 96.

The step 90 consists of calculating and registering in a memory the following exponentiations of the variable M:

$$M^\alpha \bmod n;$$

where:
M is the message;
α is an exponent;
n is the modulus.

The preceding exponentiation is calculated for all the values of the exponent α between 2 and m−1, m being equal to $2^r$, where r is a parameter pre-defined by the user. This step is represented in a conventional manner in FIG. 6 by the caption "$M^\alpha$ mod n for all α=2, 4, . . . m−1".

The step 92 consists of cutting the binary representation of the exponent E into s' r-bit words, each denoted $F_i$, where i is an index of the word and varies from 0 for the word furthest to the right in the binary representation of E to s'−1 for the word furthest to the left of this same binary representation. s' is calculated according to the following relationship:

$$k=s' \cdot r$$

where:
k is the number of bits of the binary representation of E;
r is the pre-defined parameter.

If k is not divisible by r, bits equal to 0 are added to the left of the binary representation of the exponent E in order to obtain a binary representation including a number of bits divisible by the parameter r. For example, if r and k are respectively equal to 5 and 512 bits then 3 bits of zero value are added to the left of the binary representation of the exponent E in order to obtain a binary representation including 515 bits, which makes it possible to obtain s' equal to 103.

The different words $F_i$ are obtained, for example, by successive operations of shifting to the left of the exponent E of r bits in a shift left register.

The step 94 consists of calculating $M^{F_{s'-1}}$ mod n and allocating the result to a variable C according to the following relationship:

$$C:=M^{F_{s'-1}} \bmod n;$$

where:
n is the modulus;
$F_{s'-1}$ is the $(s'-1)^{th}$ word determined during the step 92;
M is the message;
C is the variable in which the result of the operation 94 is stored.

The step 96 consists of reiterating a loop of operations as long as the index i initialised at the value of s'−2 is not less than or equal to 0, the index i being decremented at the end of each iteration of the loop. This loop of operations is denoted in a conventional manner "for i=s'−2 downto 0". The variable s' which determines the number of iterations has been defined previously.

This loop of operations comprises two successive operations 98, 100.

The operation 98 consists of calculating a modular exponentiation of the variable C and then allocating the result to the variable C according to the following relationship:

$$C := C^{2^r} \bmod n$$

where:
C is the variable initialised during the step 94;
r is the pre-defined parameter;
n is the modulus.

The operation 100 consists of calculating a modular multiplication of the variable C, previously obtained during the operation 98, by the variable $M^{F_s-1}$ if the word $F_i$ is different from 0 according to the following relationship:

$$C := C \cdot M^{F_i} \bmod n$$

where:
n is the modulus;
$F_i$ is the word of index i determined during the step 92;
C is the variable previously calculated during the operation 98.

This operation is represented in a conventional manner in FIG. 6 by the caption "If $F_i \neq 0$ Then $C := C \cdot M^{F_i} \bmod n$".

At the end of the execution of the loop of operations 96, the variable C contains the result of the modular exponentiation of the message M.

The m-ary method described above for calculating a modular exponentiation implements approximately δ operations of modular multiplication, δ being calculated by the following relationship:

$$\delta = 2^r - 2 + k - r + (k/r - 1)(1 - 1/2^r)$$

where:
k is the number of bits of the exponent E;
r is the pre-defined parameter.

This represents a reduction in the number of operations by comparison with other known methods, such as the LR binary algorithm, of 17 to 18% when the exponentiation relates to large numbers encoded on 512 or 1024 bits. However, certain methods are known to be even faster, such as for example the RL binary algorithm which permits parallel operations. However, it has been determined experimentally that the m-ary method for a parameter r chosen to be equal to 5 bits is an optimum compromise between the number of modular multiplication operations carried out and the resources necessary in order to implement this method. "Resources" is intended to mean for example the number of cells of a FPGA component.

Figure 7:
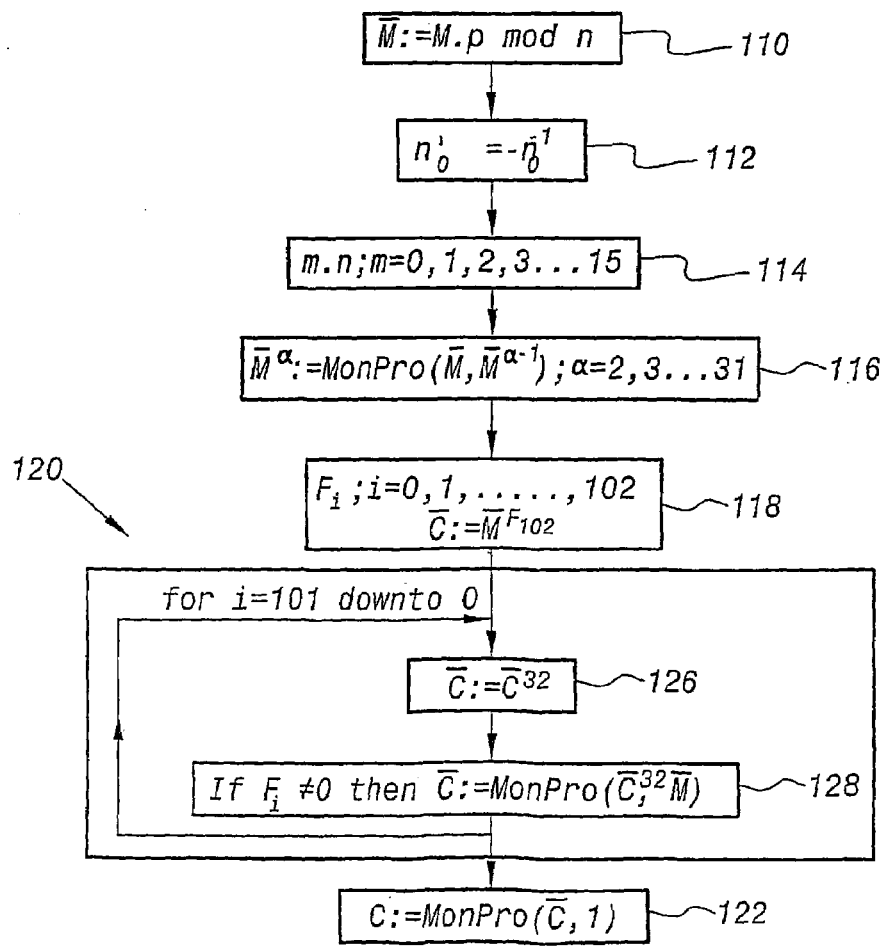
FIG. 7 shows a method of modular exponentiation according to the invention.

FIG. 7 shows a method of calculation of a modular exponentiation according to the invention which is illustrated in the case of the calculation of the following exponentiation:

$$M^E \bmod n$$

where:
M, E are natural integers encoded in binary form on a maximum of 512 bits;
M is the message;
E is the exponent; and
n is the modulus.

The method of modular exponentiation according to the invention implements the m-ary method in which the modular multiplications are carried out according to the Montgomery method described with regard to FIG. 1. The Montgomery products are for example calculated according to the method of FIG. 5 with a radix equal to 4 bits. Furthermore, in the particular case described here the parameter r of the m-ary method is chosen to be equal to 5 bits in such a way as to speed up the time required to perform the calculation of the exponentiation for input variables encoded on 512 or 1024 bits.

This method comprises seven successive steps 110, 112, 114, 116, 118, 120 and 122.

The step 110 consists of calculating the Montgomery remainder of the message M according to the following relationship:

$$\overline{M} := M \cdot p \bmod n$$

where:
M is the message;
p is the parameter of the Montgomery method defined during the step 4 of the method of FIG. 1 according to the following relationship: $p = 2^k$, where k is the number of bits of the modulus n;
n is the modulus;
$\overline{M}$ is the variable in which the remainder of the message M is registered.

The calculation of the remainder of M is carried out by conventional methods such as the extended Euclidean algorithm.

The step 112 consists of calculating the variable $n'_0$ according to the following relationship: $n'_0 = -n_0^{-1}$. This calculation has already been described with regard to step 2 of FIG. 1 and therefore it will not be described again here in detail. This calculation is also carried out by conventional methods such as the extended Euclidean algorithm.

The step 114 consists of calculating all of the second products m·n. For this the product m·n is calculated for each value of m between 0 and 15. In fact, an examination of the operation 26 of FIG. 2 shows that m is congruent with $u_0 \cdot n'_0$ modulo $2^\omega$, such that the value of m can only be between 0 and 15 when the radix ω is equal to 4 bits.

The step 116 consists of raising the remainder $\overline{M}$ in the Montgomery sense to the power α for all the different values of α between 2 and 31. In fact, the parameter r of the m-ary method is equal to 5 bits here, and it follows from the step 90 of the method of FIG. 6 that it is not necessary to calculate the powers $\overline{M}$ higher than 31. This step 116 is for example carried out by thirty-one successive Montgomery product calculations according to the following relationship:

$$\overline{M}^\alpha = MonPro(\overline{M}, \overline{M}^{\alpha-1})$$

where MonPro designates a Montgomery product calculated for example according to the method of FIG. 5.

During this step, the following operations are carried out in succession:
$\overline{M}^2 = MonPro(\overline{M}, \overline{M})$, where $\overline{M}$ has been calculated during the step 110;
$\overline{M}^3 = MonPro(\overline{M}, \overline{M}^2)$, where $\overline{M}^2$ has been calculated during the preceding operation;
etc . . . .

Thus $\overline{M}^2$ to $\overline{M}^{31}$ are obtained successively.

The step 118 consists of cutting the exponent E into a succession of 5-bit words called $F_i$ in accordance with the step 92 of the m-ary method described with regard to FIG. 6. Then, still in step 118, the value of $\overline{M}^{F_{102}}$ is allocated to a variable C according to the following relationship:

$$\overline{C} := \overline{M}^{F_{102}}$$

where $F_{102}$ is the $102^{nd}$ word $F_i$ as defined with regard to the step 94 of FIG. 6.

It will be noted that during this step $\overline{M}^{F_{102}}$ does not have to be calculated since this calculation has already been carried out during the step 116.

The step 120 consists of reiterating a loop of operations as long as an index i initialised at the value 101 is not strictly less than 0, the index i being decremented by 1 with each iteration of the loop of operations. The initial value of the index i is calculated in accordance with the step 96 of FIG. 6 for a parameter r of the m-ary method equal to 5 bits and a value of the variable k equal to 515 bits.

The loop of operations is made up of two successive operations 126 and 128.

The operation 126 consists of calculating and storing the raising to the power 32 of the variable $\overline{C}$ according to the following relationship:

$$\overline{C} := \overline{C}^{32}$$

where:
   $\overline{C}$ is the variable initialised at step 118;
   32 is calculated in accordance with the operation 98 of the m-ary method of FIG. 6, according to the relationship $32 = 2^5$, where 5 is the value of the parameter r of the m-ary method.

The operation 128 consists of calculating the Montgomery product of the variable $\overline{C}$ by the variable $\overline{M}^{F_i}$ and storing this result according to the following relationship:

$$\overline{C} := MonPro(\overline{C}, \overline{M}^{F_i})$$

where:
   $\overline{M}^{F_i}$ is selected from amongst the powers of $\overline{M}$ calculated at the step 116 knowing the value of $F_i$;
   MonPro designates the Montgomery product operation, for example performed in accordance with the method of FIG. 5.

It will be noted that this operation 128 also includes a test of the value of $F_i$ in such a way as to perform a Montgomery product calculation if the value of $F_i$ is different from 0.

In a variant, the Montgomery product calculation is systematically performed in order to avoid the test of the value of $F_i$.

At the end of the step 120, the step 122 is performed. This step consists of calculating the Montgomery product between the variable $\overline{C}$ and the unit 1 and storing this result according to the following relationship:

$$C := MonPro(\overline{C}, 1)$$

where:
   $\overline{C}$ is the variable calculated at step 120;
   1 represents the unit;
   C is a variable in which the result of the modular exponentiation of the input message M is registered.

It will be noted that the combination of the m-ary method and the Montgomery method in order to calculate modular multiplications is of particular interest in the case of the calculation of an exponentiation since the Montgomery remainder of the input message M is only calculated once. Thus the drawback of the Montgomery method, that is to say the necessity of calculating the remainders of input variables before carrying out the Montgomery product calculations is limited. This combination of the m-ary method and the Montgomery method therefore makes it possible to speed up the time required to perform the calculation of a modular exponentiation.

Figure 8:
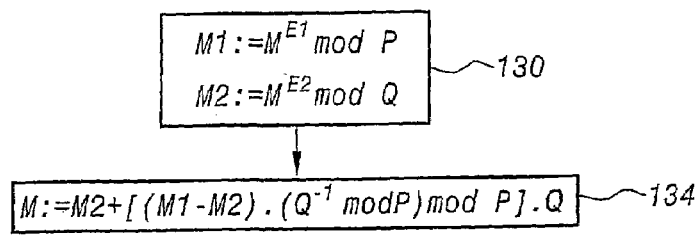
FIG. 8 shows the Chinese remainders method.

In a variant it is also possible to combine the method of FIG. 7 with the Chinese remainders method (also called the CRT method). The Chinese remainders method is succinctly described in FIG. 8. This method is known, and the reader may refer for more detail to chapter 4.1: "Fast Decryption using CRT" of the document D1.

The Chinese remainders method makes it possible to break down a first modular exponentiation operation into two second modular exponentiation operations with smaller exponents and moduli.

The first modular exponentiation is denoted as follows:

$$M^E \bmod n$$

where:
   M is an input message;
   E is an exponent;
   n is a modulus which is broken down in the form of a product such that $n = P \cdot Q$, where P and Q are first natural integers.

In a first step 130, this first exponentiation is broken down into two second exponentiations respectively module E1 and E2 which are calculated separately according to the following relationships:

$$M1 := M^{E1} \bmod P$$

$$M2 := M^{E2} \bmod Q$$

where:
   M is the input message;
   E1 = E mod (P−1);
   E2 = E mod (Q−1);
   M1 and M2 are variables for storage of the intermediate results.

In a following step 134, the result of the first modular exponentiation is obtained by combining the previously calculated variables M1 and M2 according to the following relationship:

$$M := M2 + [(M1 - M2) \cdot (Q^{-1} \bmod P) \bmod P] \cdot Q$$

where:
   M1 and M2 are the variables calculated at step 130;
   Q and P are the first numbers such that $n = P \cdot Q$.

As k is the number of bits necessary in order to encode the modulus n, it is possible to choose P and Q such that P and Q have a number of bits substantially equal to k/2. In these conditions, it is considered that the Chinese remainders method makes it possible to reduce by a factor 4 the number of operations required in order to calculate the first exponentiation, when this latter is implemented by computing software. This factor is of the order of 2 when the Chinese remainders method is implemented by computing hardware such as a FPGA component. Furthermore, in order to speed up the time required to perform the calculation of the first exponentiation, the calculations of the variables M1 and M2 can be effected in parallel.

It will be noted that this method thus makes it possible to break down a first modular exponentiation concerning large numbers encoded on 1024 bits into two second modular exponentiations concerning large numbers encoded on 512 bits.

Estimations of the time required for calculation of a first modular exponentiation have been made in the following conditions:
   the first modular exponentiation concerning large numbers of 1024 bits is broken down into two second modular exponentiations each of 512 bits;

each of the second modular exponentiations is calculated according to the method of FIG. 7 in which the Montgomery products are calculated according to the method of FIG. 5.

In these conditions when the method is implemented by a FPGA component working at 40 MHz, the time required to perform the calculation of the first modular exponentiation is substantially equal to 4.71 milliseconds.

In the same conditions but for large numbers encoded on 102 bits it has been determined that the time required to perform the calculation of a first exponentiation is substantially equal to 17.8 milliseconds.

Figure 9:
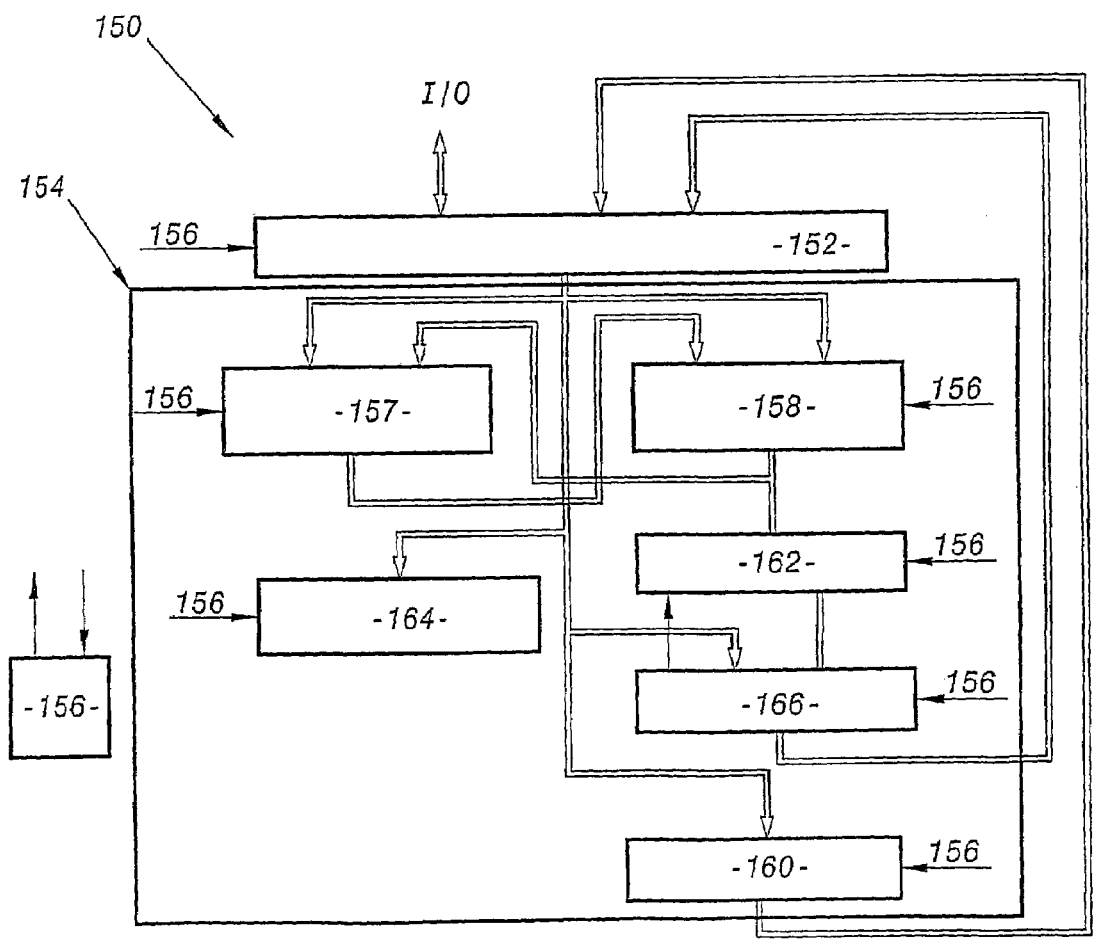
FIG. 9 is a schematic view of a Montgomery multiplier according to the invention.

FIG. 9 is a schematic representation of computing hardware 150 according to the invention. This hardware is called here a "Montgomery multiplier". In this Figure only the elements specific to the invention have been shown. The other components which are not shown but are necessary to the implementation of the method of FIG. 5 may be easily determined in a conventional manner on the basis of the elements described previously. Thus the components necessary in order to implement the operations 78 and 82 of FIG. 5 as well as the division operations have not been shown. Equally, the storage buffers for the variables C1, S1, C2, S2, R and u are not shown.

This multiplier 150 includes a memory 152 connected to the input and the output of specific computing means 154 under the control of control means 156.

The Montgomery multiplier 150 described here by way of example is adapted to co-operate with the principal computing means (not shown). These principal computing means perform for example a modular exponentiation according to the method of FIG. 7. In such a situation the Montgomery multiplier 150 is a coprocessor which makes it possible to speed up the time required to perform the Montgomery product calculations.

The memory 152 is connected by means of the data input/output bus to the principal computing means (not shown).

The memory 152 is adapted to store the following variables:

the variable $\overline{M}$ calculated during the step 110 of the method of FIG. 7;

the variable $n'_0$ calculated during the step 112 of the method of FIG. 7;

the second products m·n calculated during the step 114 of the method of FIG. 7;

the variables $\overline{M}^{\alpha}$ a calculated during the step 116 of FIG. 7;

the variable $\overline{C}$ initialised during the step 118 and calculated during the operations 126 and 128 of the method of FIG. 7;

the unit 1 necessary for carrying out the step 122 of the method of FIG. 7; and the first products $\overline{a}_i \cdot \overline{b}$ pre-calculated during the step 70 of the method of FIG. 5.

The specific computing means 154 include a first and a second carry-save adder 157, 158, a first and a second conventional adder 160 and 162, a shift right register 164 and a conventional subtractor 166.

The first carry-save adder 157 is connected to an output of the memory 152 and to an output of the second carry-save adder 158. It is also connected to the input of the second carry-save adder 158. This carry-save adder is intended here to carry out the first addition operation 76 of the method of FIG. 5. Its structure is conventional and follows from that described with regard to FIG. 3A.

The second carry-save adder 158 is connected to the output of the memory 152 and to an output of the first carry-save adder 157. It is also connected to an input of the first carry-save adder 157. This adder 158 is intended here to carry out the second addition operation 80 of the method of FIG. 5. Its structure is similar to that of the first carry-save adder 157.

The first conventional adder 160 is connected to an input and to the output of the memory 152. This adder is intended to carry out the pre-calculation of the first products $\overline{a}_i \cdot \overline{b}$ and the second products m·n. For example, the calculation of the second products m·n is carried out according to the following succession of calculations:

2.$N:=N+N$

3.$N:=N+2.N$

4.$N:=N+3.N$ etc . . . .

The results of the calculations of the first and the second products are then stored in the memory 152 and the locations provided for that purpose.

The second conventional adder 162 is connected to the output of the second carry-save adder 158 and to an input of the subtractor 166. This second adder 162 is intended to carry out the recombination operation of FIG. 5. Its structure follows from that described with regard to FIG. 3B. However, the cells which make it up, such as the cell 48 of FIG. 3B, are grouped in stages of 32 cells. The output of each stage is directly connected to a corresponding stage in the subtractor 166 in such a way that as soon as the calculation of the addition in one of the stages is finished the result is directly transmitted to the corresponding stage of the subtractor 166 without waiting. Thus the subtractor 166 performs the subtraction operation with only one clock cycle delay on the addition operation. This structure is known under the name "pipe line", and makes it possible to speed up the time required to perform operations.

The subtractor 166 is adapted to carry out the operation 86 of FIG. 5. Therefore for example it is connected to the outputs of the second conventional adder 162 and of the memory 152. It is also connected to an input of the memory 152 for example in order to store the result of the reduction operation 86.

The shift right register 164 is adapted to shift to the right by ω bits, ω being the radix of the high-radix Montgomery method. This register 164 is intended to carry out the operations of calculating the $\overline{a}_i$, the result then being used in order to select one of the corresponding first products $\overline{a}_i \cdot \overline{b}$ in the memory 152. The connections of the shift register 164 to the other components of FIG. 9 have not been shown in order to simplify the schematic representation, but such connections can be easily determined.

The control means 156 are adapted to control the operation of the specific computing means 154 and of the memory 152 in accordance with the method of FIG. 5. These control means are designed in a conventional manner.

All of the elements in FIG. 9 are, for example, implanted in a FPGA component or in a ASIC component. In a variant this component is associated with other electronic components on an electronic card in such a way as to produce an electric card conforming to the PCI standard. A card conforming to the PCI standard can be slotted into standard computers, and these latter are then adapted to form the principal computing means.

In the case of a FPGA component with the reference XIL-INX XCV1600E-6 operating at 45 MHz, the estimates of the number of clock cycles required in order to perform each step of the method of FIG. 5 are as follows:

35 clock cycles for the step 70;

260 clock cycles for the step 72;

39 clock cycles for the step 74 of recombination and reduction.

Thus the estimate of the total number of clock cycles in order to calculate a Montgomery product according to the method of FIG. 5 is 334 clock cycles for the input variables encoded on 512 bits.

In these conditions it has also been estimated that the method of FIG. 7 implements 643 Montgomery products and that the step 114 of FIG. 7 of pre-calculation of the second products m·n necessitates 38 clock cycles. Thus an estimate is obtained of the number of clock cycles necessary in order to calculate a modular exponentiation concerning large numbers of 512 bits equal to 214223 clock cycles. For an operating frequency of the FPGA component of 45 MHz this corresponds to a number of 512 bit exponentiations substantially higher than 200 per second. It will be noted that for this estimate it is considered that the steps 110 and 112 of the method of FIG. 7 are performed by the principal computing means associated with the Montgomery multiplier 150. Consequently the number of clock cycles required in order to execute these two operations is not taken into account in this estimate. However, it is admitted that the time required to perform them is approximately 10 times less than that of steps 114 to 122.

In a variant the specific computing means 154 comprise one single carry-save adder. In fact, when the method of FIG. 5 is being carried out the first addition operation 76 always precedes the second addition operation 80 since the result of the first addition 76 is used in this second addition operation 80. Consequently the first and the second carry-save adders 157, 158 are never active at the same time, and it is therefore possible to replace them by one single carry-save adder which carries out the first addition operation 76 and the second addition operation 80 alternately.

Figure 10:
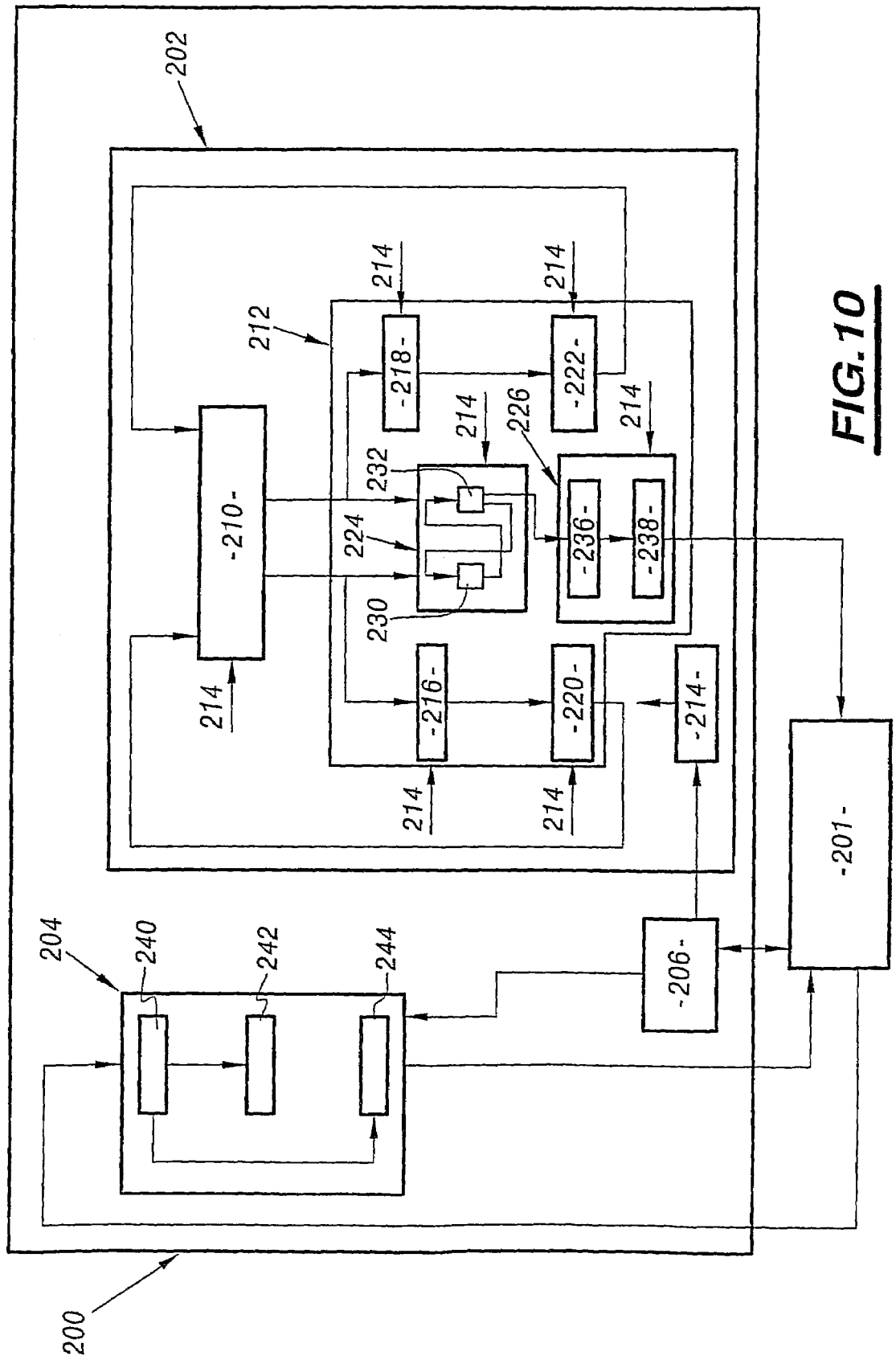
FIG. 10 is a schematic view of a modular exponentiator according to the invention.

FIG. 10 is a schematic representation of the computing hardware 200 according to the invention associated with principal computing means. In this schematic representation only the principal electronic components have been shown, but the other components can be easily determined.

The principal computing means 201 are adapted to perform the modular exponentiations according to the method of FIG. 7 by co-operating with the computing hardware 200. They are, for example, formed with a computer. In the particular case described here, the means 201 are adapted to perform a first and a second modular exponentiation. The first and the second modular exponentiations are each carried out according to the method of FIG. 7 and consequently implement respectively the first and the second Montgomery products.

The computing hardware 200 is adapted to form a coprocessor for the principal computing means 201. It includes a Montgomery multiplier 202 associated with means for shifting to the left 204 under the control of first control means 206.

The Montgomery multiplier 202 is a variant of the Montgomery multiplier 150 of FIG. 9 in which the use of the resources is optimised. In fact it is adapted to perform the first and the second Montgomery product calculations substantially in parallel without nevertheless halving the resources to be implemented. Thus it makes it possible to divide by two the time required to perform two Montgomery product calculations.

This Montgomery multiplier 202 includes a memory 210 associated with specific computing means 212 under the control of second control means 214. Just as in FIG. 9, only the principal components have been shown, but the other components can be easily determined.

The memory 210 is adapted to store the following variables:
- the remainder $\overline{M}$ of an input message M of the first exponentiation, calculated during the step 110 of the method of FIG. 7 by the computing means 201.
- the remainder $\overline{M}'$ of an input message M' of the second exponentiation, calculated during the step 110 of the method of FIG. 7 by the computing means 201.
- the variables $n'_0$ and $n''_0$ calculated during the steps 112 of the method of FIG. 7 respectively for the first and the second modular exponentiations;
- the second products m·n and m'·n' calculated during the steps 114 of the method of FIG. 7 respectively for the first and the second modular exponentiations;
- the variables $\overline{M}^\alpha$ and $\overline{M}'^\alpha$ calculated during the steps 116 of the method of FIG. 7 respectively for the first and the second modular exponentiations;
- the variables $\overline{C}$ and $\overline{C}'$ calculated during the step 118 and during the operations 126 and 128 of the method of FIG. 7 respectively for the first and the second modular exponentiations;
- the unit 1 necessary in order to perform the step 122 of the method of FIG. 7;
- the moduli n and n' respectively of the first and the second modular exponentiations.

The memory 210 includes a first and a second data input buffer in such a way as to register two different data items simultaneously. It also has a first and a second data output buffer in such a way as to make simultaneously available to the specific computing means 212 two different data items, one in each data buffer.

The specific computing means 212 include a first and a second shift right register 216, 218, a first and a second conventional adder 220, 222, a block of carry-save adders 224 and a block 226 for recombination and reduction.

The first shift right register 216 is connected to the first data output buffer of the memory 210 and top the input of the first conventional adder 220. This first shift register 216 is intended to be used during the operations of calculating the first modular exponentiation. Thus this register is used in a similar manner to the register 164 of FIG. 8 in order to calculate the $\bar{a}_i$.

The second shift register 218 is similar to the first shift register 216. However, this latter is connected to the second data output buffer of the memory 210 and to the input of the second conventional adder 222. This shift register is intended to be used during the operations of calculating the second modular exponentiation.

The first conventional adder 220 is connected to the first data input buffer of the memory 210. This conventional adder 220 is intended to be used for calculating the first modular exponentiation. Its structure and its operation are similar to those of the conventional adder 160 of FIG. 8.

The second conventional adder 220 is connected at the output of the second shift register 118 and to the second input buffer of the memory 210. Its structure and its operation are similar to those of the conventional adder 160 of FIG. 8.

The block 224 of carry-save adders is connected to the first and the second data output buffers of the memory 210, and to the input of the recombination and reduction block 226. This block 224 comprises two carry-save adders 230 and 232. The first and the second carry-save adders 230, 232 are respectively adapted to carry out the first addition operation 76 and the second addition operation 80 of the method of FIG. 5. These two carry-save adders 230, 232 are controlled by the second control means 214 so that the operations of calculating the first and the second Montgomery products are interlaced. Thus after an initialisation phase the first addition operation 76 for the first Montgomery product is performed by the first carry-save adder 230 whilst at the same time the second addition operation 80 for the second Montgomery product is performed by the second carry-save adder 232. Then during the following operations of executing the loop of operations 72, the situation is reversed, that is to say that the carry-save adder 230 performs the first addition operation 76 for the calculation of the second Montgomery product whilst at the same time the second carry-save adder 232 performs the second addition operation 80 for the calculation of the first Montgomery product. The second control means 214 take advantage of the fact that in the method of FIG. 5 applied to the calculation of one single Montgomery product the first and the second addition operations are always successive and cannot be carried out at the same time. Consequently during the calculation of a single Montgomery product there is always a carry-save adder which is inactive. Thus the second control means described here control the inactive carry-save adder in order to perform an addition operation intended for a second Montgomery product performed in parallel with the first.

The recombination and reduction block 226 is made up of a conventional adder 236 connected to the input of a conventional subtractor 238. The conventional adder 236 is connected to the output of the block 224 of carry-save adders. This conventional adder 236 is adapted to carry out the recombination operation 84 of the method of FIG. 5.

The subtractor 238 is connected for example to the input of the principal computing means 201 capable of using the result of the Montgomery product. The subtractor 238 is adapted to carry out the reduction operation 86 of the method of FIG. 5.

The second control means 214 are provided in a conventional manner and are connected to all of the components of the Montgomery multiplier 202. They are also adapted to control the different operations of calculating the first and the second Montgomery products produced by the Montgomery multiplier 202.

The Montgomery multiplier 202 is produced for example with the aid of a FPGA or ASIC component.

The shift left means 204 are connected to the input and to the output of the principal computing means 201 under the control of the first control means 206.

The means 204 for carrying out a shift to the left include a memory 240 of the RAM type (random access memory) in which a first and a second exponent are stored which correspond respectively to those of the first and the second modular exponentiations. The first and the second exponents are denoted respectively E1 and E2. This memory 240 is connected to the input of a first and a second r-bit shift left register 242, 244, r being the parameter of the m-ary method.

The shift left register 242 is adapted to determine and supply the variables $F_i$ derived from the exponent E1 in accordance with step 118 of the method of FIG. 7. This shift register includes a number of bits which is lower than that of the exponent E1, for example 32 bits whereas the exponent E1 is encoded on 512 bits. Thus as soon as all of the bits contained in this register have been shifted, the register is immediately reloaded with the following 32 bits of the exponent E1 extracted from the memory 240. This makes it possible to use a 32-bit shift register to shift the numbers encoded on a higher number of bits.

The shift left register 244 is similar to the shift register 242, but it is intended to supply the variables $F'_i$ derived from the exponent E2.

The first control means 206 are connected to the shift left means 204 and to the second control means 214. They are adapted to control the shift left means 204 and the Montgomery multiplier 202 by means of the second control means 214. They are also connected to the principal computing means 201 and adapted to co-operate with these latter in order to implement the method of FIG. 7. Thus the steps 110 and 112 of the method of FIG. 7 are, for example, carried out by the computing means 201 whilst the steps 114 to 122 implement the computing hardware 200 to speed up the calculation time.

All of the elements of FIG. 10 are for example implanted in a FPGA component or in a ASIC component. In a variant this component is associated with other electronic components on an electronic card in such a way as to produce an electronic card which conforms to the PCI standard. A card which conforms to the PCI standard can be slotted into standard computers, and these latter are then adapted to form the principal computing means.

In a variant the first modular exponentiation is carried out on the least significant bits of the input message whilst the second modular exponentiation is carried out on the most significant bits of this same message, and the results of the exponentiations on the least significant bits and the most significant bits are then recombined in order to obtain the final result.

The operation of the components of the computing hardware shown in FIGS. 9 and 10 is conventional per se. The functioning of the co-operation between these different components follows directly from the methods described with regard to FIGS. 5 and 7. Consequently the co-operation between the different components will not be described in greater detail here.

The operation of the method of FIG. 7 will now be illustrated with the aid of a simple example consisting of calculating the following modular exponentiation:

$$149^{100} \bmod 165$$

where:
  149 is the value of the input message in decimal, denoted M in this example;
  100 is the value of the exponent in decimal, denoted E in this example;
  165 is the value of the modulus in decimal, denoted n in this example.

In the following description of this example, and in order to simplify the presentation, the Montgomery products are calculated according to the high-radix Montgomery method of FIG. 2 and not by the method of FIG. 5. The radix is chosen here to be equal to 4 bits.

Moreover, the parameter r of the m-ary method is chosen here to be equal to 5 bits.

The binary representations of M, n and E are as follows:

$$M = 1001\ 0101 (=149\ dec)$$

$$E = 0110\ 0100 (=100\ dec)$$

$$n = 1010\ 0101 (=165\ dec).$$

It will be deduced from these binary representations that the input variables are encoded on 8 bits and that consequently the parameter p of the step 110 of FIG. 7 which is necessary in order to calculate the remainder of M, denoted $\overline{M}$, is equal to $2^8$, that is to say 256. The step 100 of the method of FIG. 7 therefore consists of carrying out the following calculation:

$$\overline{M} = 149 \times 256\ mod\ 165.$$

By a conventional method, such as the extended Euclidean algorithm, this gives: $\overline{M} = 29$ dec.

The step 112 of FIG. 7 consists of calculating $n'_0$ according to the relationship defined at step 2 of FIG. 1. For this, first of all $n_0$ is determined, that is to say the 4 least significant bits of the modulus n. $n_0$ is then equal to 5. Next, $n_0^{-1}$ is calculated with the aid of the following relationship:

$n_0 \cdot n_0^{-1} = 1 \bmod 16.$

In order to calculate the value of the variable $n_0^{-1}$ use is made of the fact that this value is a natural integer between 0 and 15. Consequently for each possible value of the variable $n_0^{-1}$ the following product is calculated:

$n_0 \cdot n_0^{-1} \bmod 16.$

Then the value of $n_0^{-1}$ which satisfies the previously defined relationship is selected. By this method it is determined that $n_0^{-1}$ is equal to 13.

Next its complement to 1 is calculated and $n'_0=3$ is obtained.

The step 114 of the method of FIG. 7 consists of pre-calculating the 16 possible values of the second products m·n. Given the simplicity of the example described here, this will be done not in this step but directly at the moment when the value of one of the second products is required.

The step 116 consists of calculating $\overline{M}^\alpha$ for the successive values of $\alpha$ between 2 and 31. However, in the particular example described here the exponent E breaks down into only two 5-bit words $F_0$ and $F_1$ of which the values are as follows:

$F_0 = 00100 (=4\ dec)$ $F_1 = 00011 (=3\ dec).$

Consequently only the variables $\overline{M}^3$ and $\overline{M}^4$ are necessary in order to perform the following steps. Therefore only the two variables $\overline{M}^3$ and $\overline{M}^4$ will be calculated here.

In order to calculate $\overline{M}^3$ and $\overline{M}^4$ the following operations are carried out successively:

$\overline{M}^2 = MonPro(\overline{M}, \overline{M})$ $\overline{M}^3 = MonPro(\overline{M}, \overline{M}^2)$ $\overline{M}^4 = MonPro(\overline{M}, \overline{M}^3).$ The calculation of these different Montgomery products is carried out according to the method described with regard to FIG. 2. The method is identical for the calculation of $\overline{M}^2$, $\overline{M}^3$ and $\overline{M}^4$, and therefore only the calculation of $\overline{M}^2$ is described below.

At step 16 of the method of FIG. 2 applied to the calculation of $\overline{M}^2$, the first products $\overline{M}_i \cdot \overline{M}$ are pre-calculated, where the variable $\overline{M}_i$ takes successively the following values:

$\overline{M}_0 = 1101 (=13\ dec)$ $\overline{M}_1 = 0001 (=1\ dec)$

After calculation, $\overline{M}_0 \cdot \overline{M} = 377;$ and $\overline{M}_1 \cdot \overline{M} = 29$ are obtained.

The loop 18 of operations of FIG. 2 is then executed successively for the indices i=0 and i=1.

For i=0, the operations 24 to 30 of the loop 18 are therefore as follows:

$u := \overline{M}_0 \cdot \overline{M} = 1\ 0111\ 1001 (=377\ dec)$ $m := u_0 \cdot n'_0 \bmod 2^\omega = 93 \bmod 16 = 11$ $u := u + m/n = 377 + 11 \times 165 = 2192$ $u := u/2^\omega = 2192/16 = 137.$ For the index i=1, the operations 24 to 30 of the loop 18 are therefore as follows:

$u := u + \overline{M}_1 \cdot \overline{M} = 137 + 129 = 166$ $m := u_0 \cdot n'_0 \bmod 2^\omega = 36 \bmod 16 = 2$ $u := u + m \cdot n = 166 + 2\ 165 = 496$ $u := u/2^\omega = 496/16 = 31.$ Therefore $\overline{M}^2 = 31$ is obtained. In a similar manner it is determined that $\overline{M}^3 = 164$; and $\overline{M}^4 = 16$.

It will be noted that $\overline{M}^4$ at the end of the loop of operations 18 is equal to 181, which is higher than the modulus, and consequently the reduction step 20 must be performed.

During the operation 118 of the method of FIG. 7, the value of the variable $\overline{M}^{Fs-1}$, that is to say here $\overline{M}^{Fi}$, is allocated to the variable $\overline{C}$.

The operations 126 and 128 of the loop of operations 120 of the method of FIG. 7 are then performed for the value of the index i=0.

The operation 126 consists of calculating the variable $\overline{C}^{32}$, that is to say here calculating $(\overline{M}^3)^{32}$. The following successive operations are then performed:

$\overline{M}^8 = MonPro(\overline{M}^4, \overline{M}^4)$ $\overline{M}^{16} = MonPro(\overline{M}^8, \overline{M}^8)$ $\overline{M}^{32} = MonPro(\overline{M}^{16}, \overline{M}^{16})$ $\overline{M}^{64} = MonPro(\overline{M}^{32}, \overline{M}^{32})$ $\overline{M}^{96} = MonPro(\overline{M}^{64}, \overline{M}^{32}) = (\overline{M}^3)^{32}$ These Montgomery products are calculated according to the method described with regard to FIG. 2. The calculations of the variables $\overline{M}^{16}$, $\overline{M}^{32}$, $\overline{M}^{64}$, $\overline{M}^{96}$ are similar to that of $\overline{M}^8$, and therefore they will not be described in detail here.

The calculation of $\overline{M}^8$ is carried out according to the following relationship:

$\overline{M}^8 = MonPro(\overline{M}^4, \overline{M}^4) = MonPro(16, 16)$

During the step 16 of the method of FIG. 2, the first two Montgomery products $\overline{a}_i \cdot \overline{b}$, that is to say here $\overline{M}_0^4 \overline{M}^4$ and $\overline{M}_1^4 \cdot \overline{M}^4$ are pre-calculated. The values of $\overline{M}_0^4$ and $\overline{M}_1^4$ are as follows:

$\overline{M}_0^4 = 0000 (=0\ dec)$ $\overline{M}_1^4 = 0001 (=1\ dec)$

From this the following values of the first products are deduced:

$\overline{M}_0^4 \cdot \overline{M}^4 = 0 \times 16 = 0$ $\overline{M}_1^4 \cdot \overline{M}^4 = 1 \times 16 = 16$ The loop of operations 18 of FIG. 2 is then executed successively for i=0 and i=1.

For i=0, the operations 24 to 30 of the loop 18 are therefore as follows:

$u := u + \overline{a}_i \cdot \overline{b} = 0$ $m := u_0 \cdot n'_0 \bmod 2^\omega = 0 \times 3 \bmod 16 = 0$ $u := u + m \cdot n = 0 + 0 \times 165 = 0$ $u := u/2^\omega = 0/16 = 0$ For i=1, the operations 24 to 30 of the loop 18 are therefore as follows:

$$u := u + \bar{a}_i \cdot \bar{b} = 0 + 16 = 16$$

$$m := u_0 \cdot n'_0 \bmod 2^\omega = 0 \times 3 \bmod 16 = 0$$

$$u := u + m \cdot n = 16 + 0 \times 165 = 16$$

$$u := u/2^\omega = 16/16 = 1$$

In a similar manner the following numerical results are obtained:

$$\overline{M}^{16} = 136$$

$$\overline{M}^{32} = 31$$

$$\overline{M}^{64} = 16;$$

$$\overline{M}^{98} = 136.$$

When the operation 128 of the method of FIG. 7 is being carried out, $F_0$ being different from 0, the Montgomery product between the variable $\overline{C}^{32}$ and $\overline{M}^{F_0}$ is calculated according to the following relationship:

$$\overline{C} := MonPro(\overline{M}^{96}, \overline{M}^4)$$

where:
$\overline{M}^{96} = 136$;
$\overline{M}^4 = 16$.

At the end of the calculation of this Montgomery product according to the method of FIG. 2 the following result is obtained:

$$\overline{C} := MonPro(136, 16) = 91$$

The loop of operations 120 of the method of FIG. 7 is only executed one single time since the initial value of the index i is 0.

At the end of the execution of the loop of operations 120, the step 122 is performed. It consists of carrying out the following operation:

$$C := MonPro(\overline{C}, 1)$$

where:
$\overline{C} = 91$;
1 is the unit.

At the end of the calculation of this Montgomery product according to the method of FIG. 2 the following numerical result is obtained:

$$C := MonPro(91, 1) = 1$$

Thus the final result of the modular exponentiation $149^{100}$ mod 165 is equal to 1.

Therefore it will be appreciated on reading the preceding description that the invention makes it possible to speed up the time required to perform the calculation of a Montgomery product on computing hardware. The preceding description also describes the application of the invention to methods of calculation of modular exponentiations and multiplications, the methods of calculation of the modular exponentiations and multiplications being themselves optimized in order to speed up still more the time required to perform them. The modular multiplications or the modular exponentiations are, as has already been indicated, used in numerous processes and systems for encrypting/decrypting data. However, the applications of the invention are not limited to this field of application but extend to all the technical fields where Montgomery products, modular multiplications or modular exponentiations are used, such as for example the field of telecommunications or others.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A method of processing the calculation of a Montgomery product $\bar{a} \cdot \bar{b} \cdot p^{-1}$ mod n on the basis of a high-radix $2^\omega$ Montgomery method, where ω is a radix and $\omega \geq 2$, n is a modulus of a modular product, p is equal to $2^k$, where k is a natural integer such that $2^{k-1} \leq n < 2^k$, $\bar{a}$ is a Montgomery remainder of a cryptographic variable a so that $\bar{a} := a \cdot p$ mod n, and $\bar{b}$ is a Montgomery remainder of a cryptographic variable b so that $\bar{b} := b \cdot p$ mod n, the method being implemented on computing hardware formed from a set of electronic components comprising at least one carry-save adder, having an input and an output, carried out by said computing hardware to increase a number of encrypting and decrypting operations performed per unit time, and comprising a loop of operations, iterated s times, wherein the $i^{th}$ loop with i going from 0 to s−1, comprises:

a first arithmetic operation of addition of a value of one of several first products, denoted $\bar{a}_i \cdot \bar{b}$ and a value of a variable, denoted u, wherein $\bar{a}_i$ represents the ω least significant bits of operand $\bar{a}$, after the operand $\bar{a}$ having been shifted to the right i times by ω bits;

a second arithmetic operation of addition of a value of one of several second products, denoted m·n, and a value of said variable u, where m is defined by the following relation:

$$m := u_0 \cdot n'_0 \bmod 2^\omega$$

where $u_0$ represents the ω least significant bits of the variable u, and n'$_0$ is equal to $-n_0^{-1}$, where $n_0$ represents the ω least significant bits of the modulus n, a third operation of division of the variable u by a power of 2, denoted $2^\omega$ according to a third relationship $$u := \frac{u}{2^\omega},$$

wherein the method comprises delivering, at the input of said at least one carry-save adder, the value of the variable u in the form of a carry-save ordered pair and said value of one of the several first and second products, denoted $\bar{a}_i \cdot \bar{b}$, m·n respectively, in order to perform said first and second arithmetic addition operations and in order to obtain at the output of said at least one carry-save adder a result of respectively the first and the second arithmetic addition operations in the form of a carry-save ordered pair, allocating to the value of the variable u the result obtained at the output to said at least one carry-save adder, the variable u being registered in the form of a carry-save ordered pair formed by two variables C and S, carrying out the third operation of division of the variable u in the form of a carry-save ordered pair in two steps comprising a) a preliminary step of calculation and storage of a carry digit, $R_e$, which is at risk of being lost by the division of each said variable C and S by the power of 2 and;

b) a step of division of each said variable C and S by the power of 2; and repeating the delivery and allocation operations for each iteration.

2. A method as claimed in claim 1, wherein the preliminary step of calculation of the carry digit $R_e$ comprises the operation of adding $\omega$ least significant bits of the variable C, denoted $C_0$, to $\omega$ least significant bits of the variable S, denoted $S_0$, according to a fourth relationship $R_e := C_0 + S_0$.

3. A method as claimed in claim 2, further comprising a step of recombination of u on the basis of the variables C and S of the carry-save ordered pair and of the carry digit $R_e$ by a shift operation, shifting to the right by $\omega$ bits the carry digit $R_e$ and adding the result obtained to the variables C and S according to a fifth relationship $u := C + S + R_e/2^\omega$.

4. A method as claimed in claim 1 wherein the method wherein the method further comprises at the end of performing the loop of operations:

a step of recombination of the variable u on the basis of at least the values of the variables C and S of the carry-save ordered pair calculated during the performance of the loop of operations, and a step of reduction of the variable u according to a sixth relationship $u := u - n$, where n is the modulus of the modular product, said steps of recombination and of reduction of the variable u overlapping in such a way as to speed up the time required to perform them.

5. A method as claimed in claim 1, wherein the radix $\omega$ is equal to 4 bits in order to optimize the time required for performing the calculation of a Montgomery product on input variables of the Montgomery product encoded on 512 or 1024 bits.

6. A method as claimed in claim 1, wherein the first products $\bar{a}_i \cdot \bar{b}$ are pre-calculated before performing the loop of operations.

7. A method as claimed in claim 1, wherein the second products m·n are pre-calculated before performing the loop of operations.

8. A method of speeding up the time required to perform the calculation of a first and a second Montgomery product by applying for each product a method as claimed in claim 1, wherein the method includes at least one first step during which the first addition operation for the first product is carried out at the same time as a second addition operation for the second product.

9. A method as claimed in claim 8, wherein the method comprises at least a second step shifted in time with respect to the first step, during which the second addition operation for the first product is carried out at the same time as the first addition operation for the second product.

10. A method as claimed in claim 8, wherein the method comprises at the end of performing the loop of operations:

a first step of recombination of u, then of reduction for the first product, said first step of recombination of u being performed on the basis of the variables C and S of the carry-save ordered pair and of the carry digit $R_e$ by a shift operation, said reduction being performed by shifting to the right by $\omega$ bits the carry digit $R_e$ and adding the result obtained to the variables C and S according to a fifth relationship $u := C + S + R_e/2^\omega$; and then, a second step of recombination of u, then of reduction for the second product, said second step of recombination of u being performed on the basis of the variables C and S of the carry-save ordered pair and of the carry digit $R_e$ by a shift operation, said reduction being performed by shifting to the right by $\omega$ bits the carry digit $R_e$ and adding the result obtained to the variables C and S according to a fifth relationship $u := C + S + R_e/2^\omega$.

11. A method as claimed in claim 8, wherein an input variable of the first Montgomery product performed first is made up of the least significant bits of a variable, and an input variable of the second Montgomery product performed second is made up of most significant bits of said same variable.

12. A method of speeding up the time required to perform the calculation of a modular multiplication by applying a method implementing Montgomery products, wherein the calculation of the Montgomery products is carried out by applying the method as claimed in claim 1.

13. A method as claimed in claim 12, wherein said method implementing Montgomery products is the Montgomery method.

14. A method of speeding up the time required to perform the calculation of a modular exponentiation by applying a method implementing modular multiplications, wherein the calculation of the modular multiplications is carried out by applying a method as claimed in claim 12.

15. A method as claimed in claim 14, wherein said method implementing modular multiplications is a m-ary method with a word size of r bits.

16. A method as claimed in claim 15, wherein the word size r of the m-ary method is equal to 5 bits in order to speed up the time for performing the m-ary method when input variables of the modular exponentiation calculation are encoded on 512 or 1024 bits.

17. A method as claimed in claim 15, wherein the second products m·n are pre-calculated before applying the m-ary method.

18. A method as claimed in claim 14, wherein said method implementing modular multiplications is a Chinese remainders method.

19. A method of speeding up the time required for performing a first modular exponentiation calculation using second modular exponentiations, in which the second modular exponentiations are carried out by applying the method as claimed in claim 14.

20. A method as claimed in claim 19, wherein said second modular exponentiations is a Chinese remainders method.

21. A method as claimed in claim 1, wherein the method is applied to numbers encoded on more than 320 bits.

22. A computer-readable medium upon which is encoded a sequence of programmed instructions which, when executed by a processor, cause the processor to perform the method as claimed in claim 1.

23. A system for processing the calculation of a Montgomery product $\bar{a} \cdot \bar{b} \cdot p^{-1} \bmod n$ on the basis of a high-radix $2^\omega$ Montgomery method, where $\omega$ is a radix and $\omega \geq 2$, n is a modulus of a modular product, p is equal to $2^k$, where k is a natural integer such that $2^{k-1} \leq n < 2^k$, $\bar{a}$ is a Montgomery remainder of a cryptographic variable a so that $\bar{a} := a \cdot p \bmod n$, and $\bar{b}$ is a Montgomery remainder of a cryptographic variable b so that $\bar{b} := b \cdot p \bmod n$, said system including computing hardware formed from a set of electronic components, said processing comprising a loop of operations, carried out by said computing hardware iterated s times, wherein the $i^{th}$ loop with i going from 0 to s−1, comprising:

a first arithmetic operation of addition of a value of one of several first products, denoted $\bar{a}_i \cdot \bar{b}$ and a value of a variable, denoted u, wherein $\bar{a}_i$ represents the ω least significant bits of operand $\bar{a}$, after the operand $\bar{a}$ having been shifted to the right i times by ω bits;

a second arithmetic operation of addition of a value of one of several second products, denoted m·n, and a value of said variable u, where m is defined by the following relation:

$$m := u_0 \cdot n'_0 \bmod 2^\omega$$

where $u_0$ represents the ω least significant bits of the variable u, and $n'^0$ is equal to $-n_0^{-1}$, where $n_0$ represents the ω least significant bits of the modulus n, a third operation of division of the variable u by a power of 2, denoted $2^\omega$ according to a third relationship $$u := \frac{u}{2^\omega},$$

wherein said computing hardware includes at least:

one carry-save adder adapted to receive as an input the variable u in the form of a carry-save ordered pair and said value of one of several products, denoted $\bar{a}_i \cdot \bar{b}$, m·n respectively, and to deliver at an output the result of respectively the first and the second arithmetic addition operations in the form of a carry-save ordered pair, means for allocating to the value of the variable u the result obtained at the output of said at least one carry-save adder and for storing the variable u in the form of a carry-save ordered pair formed by two variables C and S, means for carrying out the third operation of division of the variable u in the form of a carry-save ordered pair comprising a) means for calculation and storage of a carry digit, $R_e$, which is at risk of being lost by the division of each said variable C and S by the power of 2 and;

b) means for division of each said variable C and S by the power of 2.

24. A system as claimed in claim 23, wherein the system comprises at least one first carry-save adder adapted to carry out the first arithmetic addition operation and a second carry-save adder adapted to carry out the second arithmetic addition operation.

25. A system as claimed in claim 23, wherein the means for calculation and storage of the carry digit $R_e$ include means for addition of the ω least significant bits of the variable C, denoted $C_0$, to the ω least significant bits of the variable S, denoted $S_0$, according to a fourth relationship $R_e := C_0 + S_0$.

26. A system as claimed in claim 23, further comprising:
means for recombination of the variable u at least on the basis of the values of the variables C and S of the carry-save ordered pair, and
means for reduction of the variable u, said means for recombination of the variable u and said means for reduction being connected to one another in such a way that operation thereof overlaps under the control of the control means.

27. A system as claimed in claim 23, wherein the radix ω is equal to 4 bits in order to optimize the time required to perform a Montgomery product calculation on input variables of the Montgomery product encoded on 512 or 1024 bits.

28. A system as claimed in claim 23, further comprising means for pre-calculation of the first products $\bar{a}_1 \cdot \bar{b}$.

29. A system as claimed in claim 28, further comprising means for pre-calculation of the second products m·n.

30. A system as claimed in claim 29, wherein said means for pre-calculation of the first product and/or said means for pre-calculation of the second product include an adder.

31. A system according to claim 23 for speeding up the time required to perform the calculation of a first and a second Montgomery product, comprising:

a first Montgomery product calculation system configured to calculate a first Montgomery product according to claim 23; and a second Montgomery product calculation system configured to calculate a second Montgomery product according to claim 23;

wherein the carry save adder of the first Montgomery product calculation system and the carry-save adder of the second Montgomery product calculation system are activated simultaneously, in such way that at a same first time the carry-save adder of the first Montgomery product calculation system carries out the first arithmetic operation for the first Montgomery product, while the carry-save adder of the second Montgomery product calculation system carries out the second arithmetic operation for the second Montgomery product.

32. A system as claimed in claim 31, further comprising a single means for recombining the variable u on the basis of at least the values of the variables C and S of the carry-save ordered pair, said single means for recombining the variable u connected to the input of a single means for reduction of the variable u according to a relationship $$u := u - n,$$

where n is a modulus.

33. A system according to claim 23 configured to speed up the time required to perform a modular multiplication calculation by a method implementing Montgomery products, said Montgomery product calculations being performed on computing hardware, comprising at least one system for speeding up the time required to perform the calculation of the Montgomery products as claimed in claim 23.

34. A system for speeding up the time required to perform a modular exponentiation calculation by a method implementing modular multiplications, comprising at least one system for speeding up the time required to perform the calculation of the modular multiplications as claimed in claim 33.

35. A system for speeding up the time required to perform a modular exponentiation calculation by a Chinese remainders method implementing modular multiplications, comprising at least one system for speeding up the time required to perform the modular multiplication calculation as claimed in claim 34.

36. A system for speeding up the time required to perform the calculation of a first modular exponentiation by a method implementing the calculation of a plurality of second modular exponentiations, comprising at least one system for speeding up the time required to perform the calculation of the second modular exponentiations as claimed in claim 34.

37. A system for speeding up the time required to perform a modular exponentiation calculation by an m-ary method with a word size of r bits implementing modular multiplications, comprising at least one system for speeding up the time required to perform the calculation of the modular multiplications as claimed in claim 33.

38. A system as claimed in claim 37, further comprising at least one register for shifting 5 bits to the left in order to speed up the performance of the m-ary method with a word size of r bits of the m-ary method equal to 5 bits.

39. A system for speeding up the time required to perform at least the calculation of at least a first modular exponentiation by the Chinese remainders method which itself implements second modular exponentiations, comprising at least one system for speeding up the time required to perform the calculation of the second modular exponentiations as claimed in claim 38.

40. A system according to claim 23 configured to speed up the time required to perform a modular multiplication calculation by the Montgomery method implementing Montgomery products on computing hardware, comprising at least one system for speeding up the time required to perform the calculation of the Montgomery products as claimed in claim 23.

41. An electronic component, comprising at least one system as claimed in claim 23.

42. An electronic component as claimed in claim 41, wherein said electronic component is formed with at least one FPGA.

43. An electronic card, comprising at least one system as claimed in claim 23.

44. An electronic card as claimed in claim 43, wherein said electronic card conforms to the PCI standard.

45. A machine for processing the calculation of a Montgomery product on the basis of a high radix Montgomery method, the machine being associated with at least one system as claimed in claim 23.

* * * * *